United States Patent [19]
Shimizu et al.

[11] Patent Number: 6,024,895
[45] Date of Patent: Feb. 15, 2000

[54] CROSS-LINKABLE, ELECTRICALLY CONDUCTIVE COMPOSITION, ELECTRIC CONDUCTOR AND PROCESS FOR FORMING THE SAME

[75] Inventors: Shigeru Shimizu; Masashi Uzawa; Takashi Saitoh; Masami Yuasa; Yasuyuki Takayanagi; Naoki Sugama, all of Yokohama, Japan

[73] Assignee: Mitsubishi Rayon Co., Ltd., Tokyo, Japan

[21] Appl. No.: 08/950,791

[22] Filed: Oct. 15, 1997

Related U.S. Application Data

[63] Continuation-in-part of application No. PCT/JP96/02261, Aug. 9, 1996.

[30] Foreign Application Priority Data

Aug. 11, 1995 [JP] Japan .................................. 7-227072
Oct. 15, 1996 [JP] Japan .................................. 8-291235

[51] Int. Cl.$^7$ ................................ H01B 1/12; H01B 1/20
[52] U.S. Cl. .......................................................... 252/500
[58] Field of Search ............................ 252/500; 528/210, 528/422

[56] References Cited

U.S. PATENT DOCUMENTS

| | | | |
|---|---|---|---|
| 5,137,799 | 8/1992 | Kaempf et al. | 430/270 |
| 5,482,655 | 1/1996 | Vogel et al. | 252/500 |
| 5,520,852 | 5/1996 | Ikkala et al. | 252/521 |
| 5,589,108 | 12/1996 | Shimizu et al. | 252/500 |
| 5,721,091 | 2/1998 | Watanabe et al. | 430/323 |

FOREIGN PATENT DOCUMENTS

| | | | |
|---|---|---|---|
| 0 191 302 | 8/1986 | European Pat. Off. | |
| 0 300 376 | 1/1989 | European Pat. Off. | |
| 29 50 287 | 6/1980 | Germany | |
| 19633311 | 2/1998 | Germany | |
| 61-197633 | 9/1986 | Japan | C08G 73/00 |
| 63-39916 | 2/1988 | Japan | C08G 61/12 |
| 63-199884 | 8/1988 | Japan | C23F 18/00 |
| 1-301714 | 12/1989 | Japan | C08G 73/02 |
| 3-28229 | 2/1991 | Japan | C08G 73/00 |
| 3-285983 | 12/1991 | Japan | C09K 3/00 |
| 4-32848 | 2/1992 | Japan | G03F 7/20 |
| 4-268331 | 9/1992 | Japan | C08G 73/00 |
| 4-328181 | 11/1992 | Japan | C09D 165/00 |
| 5-503953 | 6/1993 | Japan | C08L 79/00 |
| 5-178989 | 7/1993 | Japan | C08G 73/00 |
| 5-504153 | 7/1993 | Japan | C08G 73/00 |
| 5-226238 | 9/1993 | Japan | H01L 21/027 |
| 5-320958 | 12/1993 | Japan | C23F 11/00 |
| 6-32845 | 2/1994 | Japan | C08F 283/00 |
| 6-56987 | 3/1994 | Japan | C08G 73/00 |
| 6-87949 | 3/1994 | Japan | C08G 61/00 |
| 6-503604 | 4/1994 | Japan | C10M 149/14 |
| 6-145386 | 5/1994 | Japan | C08J 7/04 |
| 6-256516 | 9/1994 | Japan | C08G 75/00 |
| 6-293828 | 10/1994 | Japan | C08G 73/00 |
| 6-510555 | 11/1994 | Japan | C08G 73/00 |
| 7-10992 | 1/1995 | Japan | C08G 73/00 |
| 7-041756 | 2/1995 | Japan | C09K 3/16 |
| 7-048436 | 2/1995 | Japan | C08G 61/12 |
| 7-118524 | 5/1995 | Japan | C08L 79/00 |
| 8-092479 | 4/1996 | Japan | C08L 79/00 |

OTHER PUBLICATIONS

DeBerry, D.W., "Modification of the Electrochemical and Corrosion Behavior of Stainless Steels with an Electroactive Coating", *J. of the Electrochemical Society* 132(5):1022–1026 (May 1985).

Havinga, E. et al., "Self–doped Water–soluble Conducting Polymers", *Springer–Verlag Polymer Bulletin* 18:277–281 (1987).

Yue et al., "Effect of Sulfonic Acid Group on Polyaniline Backbone",*J. Am. Chem.* 113(7):2665–2671 (1991).

*Primary Examiner*—Mark Kopec
*Attorney, Agent, or Firm*—Pillsbury, Madison & Sutro LLP

[57] ABSTRACT

A cross-linkable, electrically conductive composition comprising (a) a soluble, electrically conducting polymer having a sulfonic acid group and/or a carboxyl group and (b) a thermally cross-linkable or ultraviolet- or electron beam-cross-linkable resin or paint.

10 Claims, No Drawings

CROSS-LINKABLE, ELECTRICALLY CONDUCTIVE COMPOSITION, ELECTRIC CONDUCTOR AND PROCESS FOR FORMING THE SAME

CROSS-REFERENCE

This application is a continuation-in-part application of PCT/JP96/02261 filed Aug. 9, 1996, which designates U.S.

TECHNICAL FIELD

This invention relates to a cross-linkable, electrically conductive composition, an electric conductor comprising the composition and a process for forming the electric conductor as well as an anticorrosive composition comprising a soluble, electrically conductive polymer as the main component and an anticorrosion method. More particularly, it relates to a composition for forming an electric conductor and anticorrosion film excellent in water resistance and solvent resistance on the surface of a substrate, an electric conductor and anticorrosion film comprising the composition and a process for forming the electric conductor and anticorrosion film.

BACKGROUND ART

Electrically conducting polymers having a sulfonic acid group or a carboxyl group are expected to exhibit an excellent solubility in water and organic solvents, so that various synthesis methods have been studied. Also, there have been reported methods for forming electric conductors comprising these electrically conductive polymers as the main component, and the like (JP-A-61-197633, JP-A-63-39916, JP-A-01-301714, JP-A-05-504153, JP-A-05-503953, JP-A-04-32848, JP-A-04-328181, JP-A-06-145386, JP-A-06-56987, JP-A-05226238, JP-A-05-178989, JP-A-06-293828, JP-A-07-118524, JP-A-0682845, JP-A-06-87949, JP-A-06-256516, JP-A-07-41756, JP-A-07-48436 and JP-A-04-268331).

However, since these soluble, electrically conducting polymers are excellent in solubility in water and organic solvents, there is such a disadvantage that electrically conductive films composed of these polymers are rather inferior in water resistance and solvent resistance. The purpose of this invention is to enhance the water resistance and solvent resistance of an electrically conducive film composed of a soluble, electrically conducting polymer having a sulfonic acid group or a carboxyl group.

As a method for the anticorrosion of the surface of a metal, a method of coating the metal surface has been generally adopted. A method of coating the metal surface with a high molecular weight compound has such a disadvantage that corrosion proceeds from the defect portion of the coating film. Moreover, a method of coating the metal surface with a chromic acid compound exhibits a very excellent anticorrosive effect; however, a substitutive method has been required from the viewpoint of both environment and health. Furthermore, a method of controlling the potential of a metal to a constant value exerts an excellent effect; however, an outside electric source and a means for controlling the potential become necessary and hence the application thereof is, as a matter of course, limited technically and economically.

Therefore, an anticorrosion method which comprises coating the metal surface with an electrically conductive polymer to control the potential to a constant value has been proposed. For example, a method which comprises coating the metal surface with a polyaniline as an electrically conductive polymer by electrolysis polymerization has been proposed [J. Electrochim. Soc., 132, 1022 (1988)]; however, it is difficult to apply this method to a metal surface having a large surface area.

Furthermore, a method which comprises coating the metal surface with a powdery polyaniline dispersed in a high molecular weight compound (JP-A-63-199884) has also been proposed; however, the anticorrosive effect is insufficient because the dispersion is not uniform.

A method which comprises dissolving a polyaniline in the dedoped state in a polar, organic solvent such as N-methylpyrrolidone or the like (JP-A-03-28229) has been proposed. However, a step of doping with a protonic acid is required after the coating, and hence, the above method is inappropriate in industry.

A method which comprises dissolving a polyaniline in the doped state in a polar, organic solvent by adding an amine such as ammonia or the like (JP-A-03-285983) has also been proposed. However, this method cannot be used in industry because ammonia is volatilized during drying. A method which comprises coating the metal surface with a solution of a soluble polyaniline and a dopant in an organic solvent (JP-A-5-320958) has been proposed; however, this method has a problem in that the addition of a dopant is necessary, and hence, the method is industrially complicated and that the solubility of the polyaniline is not sufficient. Moreover, since the polyaniline is insoluble in water, only an organic solvent must be used and this is not desirable in view of global environmental problems.

A method which comprises solubilizing a polyaniline in the doped state (JP-A-08-92479) has been proposed; however, this has a problem in industrial application because the solubility and the stability of solution are not sufficient.

Thus, in the present technical field, the development of an anticorrosive composition which, when used in the anticorrosion of a metal, is soluble in both water and organic solvents, can easily be applied to and coated on the metal, and can form a very thin film which can exert sufficient anticorrosion performance, has become an important problem.

This invention has been made for the purpose of overcoming the disadvantages possessed by conventional anticorrosive agents as mentioned above and providing an anticorrosive composition which is soluble in both water and organic solvents, is excellent in metal-applicability and metal-coatability and can exert sufficient anticorrosion performance, and also providing an anticorrosion method using the above corrosive composition.

DISCLOSURE OF THE INVENTION

The first mode of this invention is a cross-linkable, electrically conductive composition comprising (a) a soluble, electrically conducting polymer having a sulfonic acid group and/or a carboxyl group and (b) a thermally cross-linkable or ultraviolet ray (UV)- or electron beam (EB)-cross-linkable resin or paint (referred to hereinafter as the cross-linkable compound (b) in some cases).

The second mode of this invention is a cross-linkable, electrically conductive composition comprising (a) a soluble, electrically conducting polymer having a sulfonic acid group and/or a carboxyl group, (c) a compound having at least two functional groups capable of reacting with the sulfonic acid group and/or the carboxyl group of the polymer (a) (referred to hereinafter as the cross-linkable compound (c) in some cases).

The third mode of this invention is a cross-linkable, electrically conductive composition comprising (a) a soluble, electrically conducting polymer having a sulfonic acid group and/or a carboxyl group, (b) a thermally cross-linkable or UV- or EB-cross-linkable resin or paint and (c) a compound having at least two functional groups capable of reacting with the sulfonic acid group and/or the carboxyl group of the soluble, electrically conducting polymer (a).

The fourth mode of this invention is a cross-linkable, electric conductor in which on at least one surface of a substrate, there has been formed the film of a cross-linkable, electrically conductive composition comprising (a) a soluble, electrically conducting polymer having a sulfonic acid group and/or a carboxyl group, (b) a thermally cross-linkable or UV- or EB-cross-linkable resin or paint and/or (c) a compound having at least two functional groups capable of reacting with the sulfonic acid group and/or the carboxyl group of the soluble, electrically conducting polymer (a).

The fifth mode of this invention is a process for forming a cross-linkable, electric conductor which comprises forming on at least one surface of a substrate a film composed of a cross-linkable, electrically conductive composition comprising (a) a soluble, electrically conducting polymer having a sulfonic acid group and/or a carboxyl group, (b) a thermally cross-linkable or UV- or EB-cross-linkable resin or paint and/or (c) a compound having at least two functional groups capable of reacting with the sulfonic acid group and/or the carboxyl group of the soluble, electrically conducting polymer (a), and thereafter cross-linking the film by heating or with an ionizing radiation to insolubilize the same.

The sixth mode of this invention is an anticorrosive composition, characterized by comprising (a') an acidic group-containing, self-doping type, soluble, electrically conducting polymer.

The seventh mode of this invention is an anticorrosive composition, characterized by comprising (a') an acidic group-containing, self-doping type, soluble, electrically conducting polymer and further at least one member selected from the group consisting of (b') a thermally cross-linkable or UV- or EB-cross-linkable compound and (c') a compound having at least two functional groups capable of reacting with the acidic group of the polymer (a') [referred to hereinafter as the cross-linkable compound (c') in some cases].

The eighth mode of this invention is an anticorrosive film which is formed by coating the above anticorrosive composition comprising the acidic group-containing, self-doping type, soluble, electrically conducting polymer (a') on at least one surface of a substrate which is to be subjected to anticorrosion.

The ninth mode of this invention is an anticorrosion method, characterized by coating the above anticorrosive composition comprising the acidic group-containing, self-doping type, soluble, electrically conducting polymer (a') on at least one surface of a substrate which is to be subjected to anticorrosion, to form a film thereon.

BEST MODE FOR CARRYING OUT THE INVENTION

The soluble, electrically conducting polymer (a) of this invention may be any soluble, electrically conducting polymer having a sulfonic acid group and/or a carboxyl group and is not particularly limited; however, specifically, there are preferably used the soluble, electrically conducting polymers shown in JP-A-61-197633, JP-A-63-39916, JP-A-01-301714, JP-A-05-504153, JP-A-05-503953, JP-A-04-32848, JP-A-04-328181, JP-A-06-145386, JP-A-06-56987, JP-A-05-226238, JP-A-05-178989, JP-A-06-293828, JP-A-07-118524, JP-A-06-82845, JP-A-06-87949, JP-A-06-256516, JP-A-07-41756, JP-A-07-48436 and JP-A-04-268331.

Specifically, there are mentioned soluble, electrically conducting polymers having a sulfonic acid group and/or a carboxyl group, or an alkyl group or an alkyl group having an ether linkage substituted by a sulfonic acid group and/or a carboxyl group on the skeleton of a π-conjugated polymer comprising as a recurring unit an unsubstituted or substituted phenylenevinylene, carbazole, vinylene, thienylene, pyrolylene, phenylene, iminophenylene, isothianaphthene, furylene or carbazolylene or on any nitrogen atom in said polymer. Among them, there are particularly used the soluble, electrically conducting polymers having a skeleton comprising a thienylene, pyrolylene, iminophenylene or isothianaphthene.

Preferable, soluble, electrically conducting polymers (a) are water-soluble, electrically conducting polymers having a molecular weight of 1,000 or more, preferably 2,000 or more and comprising as the recurring unit at least one member selected from the group consisting of:

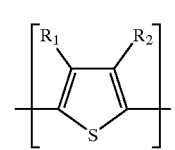

(1)

wherein each of R1–R2 is individually selected from the group consisting of H, —SO3—, —SO3H, —R$_{19}$SO$_3^-$, —R1$_9$SO$_3$H, —OCH$_3$, —CH$_3$, —C$_2$H$_5$, —F, —Cl, —Br, —I, —N(R$_{19}$)$_2$, —NHCOR$_{19}$, —OH, —O$^-$, —SR$_{19}$, —OR$_{19}$, —OCOR$_{19}$, —NO$_2$, —COOH, —R$_{19}$COOH, —COOR$_{19}$, —COR$_{19}$, —CHO and —CN in which R$_{19}$ is a C$_1$–C$_{24}$ alkyl, aryl or aralkyl group; at least one of R$_1$ and R$_2$ is a group selected from the group consisting of —SO$_3^-$, —SO$_3$H, —R$_{19}$SO$_3^-$, R$_{19}$SO$_3$H, —COOH and —R$_{19}$COOH; and the proportion of rings having said group is about 20% to 100%,

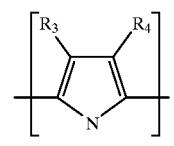

(2)

wherein each of R3–R4 is individually selected from the group consisting of H, —SO$_3^-$, —SO$_3$H, —R$_{19}$SO$_3^-$, —R1$_9$SO$_3$H, —OCH$_3$, —CH$_3$, —C$_2$H$_5$, —F, —Cl, —Br, —I, —N(R$_{19}$)$_2$, —NHCOR$_{19}$, —OH, —O$^-$, —SR$_{19}$, —OR$_{19}$, —OCOR$_{19}$, —NO$_2$, —COOH, —R$_{19}$COOH, —COOR$_{19}$, —COR$_{19}$, —CHO and —CN in which R$_{19}$ is a C$_1$–C$_{24}$ alkyl, aryl or aralkyl group; at least one of R$_3$ and R$_4$ is a group selected from the group consisting of —SO$_3^-$, —SO$_3$H, —R$_{19}$SO$_3^-$, R$_{19}$SO$_3$H, —COOH and —R$_{19}$COOH; and the proportion of rings having said group is about 20% to 100%, (3)

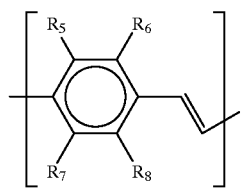

wherein each of R5–R8 is individually selected from the group consisting of H, —$SO_3^-$, —$SO_3H$, —$R_{19}SO_3^-$, —$R_{19}SO_3H$, —$OCH_3$, —$CH_3$, —$C_2H_5$, —F, —Cl, —Br, —I, —$N(R_{19})_2$, —$NHCOR_{19}$, —OH, —O—, —$SR_{19}$, —$OR_{19}$, —$OCOR_{19}$, —$NO_2$, —COOH, —$R_{19}COOH$, —$COOR_{19}$, —$COR_{19}$, —CHO and —CN in which $R_{19}$ is a $C_1$–$C_{24}$ alkyl, aryl or aralkyl group; at least one of $R_5$–$R_8$ is a group selected from the group consisting of —$SO_3^-$, —$SO_3H$, —$R_{19}SO_3^-$, $R_{19}SO_3H$, —COOH and —R19COOH; and the proportion of rings having said group is about 20% to 100%, (4)

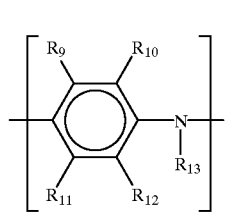

wherein each of R9–R13 is individually selected from the group consisting of H, —$SO_3^-$, —$SO_3H$, —$R_{19}SO_3^-$, —$R_{19}SO_3H$, —$OCH_3$, —$CH_3$, —$C_2H_5$, —F, —Cl, —Br, —I, —$N(R_{19})_2$, —$NHCOR_{19}$, —OH, —O—, —$SR_{19}$, —$OR_{19}$, —$OCOR_{19}$, —$NO_2$, —COOH, —$R_{19}COOH$, —$COOR_{19}$, —$COR_{19}$, —CHO and —CN in which $R_{19}$ is a $C_1$–$C_{24}$ alkyl, aryl or aralkyl group; at least one of $R_9$–$R_{13}$ is a group selected from the group consisting of —$SO_3^-$, —$SO_3H$, —$R_{19}SO_3$—, $R_{19}SO_3H$, —COOH and —$R_{19}COOH$; and the proportion of rings having said group is about 20% to 100%, (5)

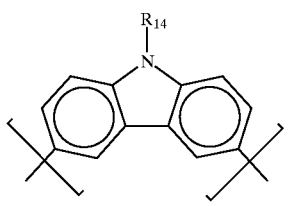

wherein R14 is selected from the group consisting of —$SO_3^-$, —$SO_3H$, —$R_{19}SO_3^-$, —$R_{19}SO_3H$, —COOH and —$R_{19}COOH$ in which $R_{19}$ is a $C_1$–$C_{24}$ alkyl, aryl or aralkyl group.

With respect to the cross-linking of these electrically conducting polymers, when a sulfonic acid group and a carboxyl group participating in doping is used in the cross-linking, there is such a disadvantage that when the number of cross-linking sites is made unnecessarily large, the electric conductivity becomes remarkably low. Accordingly, it is preferable to make the amount of the cross-linking agent added necessary and minimum. Specifically, it is preferable that a compound (c) having a functional group in an amount corresponding to 50 mole % or less, preferably 25 mole % or less, more preferably 10 mole % or less, further preferably 5 mole % or less, based on the sulfonic acid group and/or carboxyl group of the electrically conducting polymer is used because the lowering of the electric conductivity is small and the water resistance and solvent resistance are practical.

On the other hand, in the case where an electrically conducting polymer having a sulfonic acid group or a carboxyl group which does not participate in doping is used, even when the sulfonic acid group and carboxyl group are used in the cross-linking, the electric conductivity is not lowered, so that it is preferable. For example, in the doping of an electrically conducting polymer of aniline type, theoretically, it is sufficient that one sulfonic acid group or carboxyl group is present for 2 aromatic rings. Accordingly, when a soluble, electrically conducting polymer of aniline type having an acidic group such as sulfonic acid group or carboxyl group in an amount of at least 51%, preferably at least 60%, more preferably at least 70% and particularly preferably at least 80%, based on the aromatic ring is used, theoretically, it is possible to effect the cross-linking without lowering the electric conductivity and to sufficiently add the compound (c).

Also, when other electrically conducting polymers having at least 2 sulfonic acid groups on the aromatic ring are used, the same as mentioned above is also possible.

Among the above electrically conducting polymers, there are most preferably used electrically conducting polymers of aniline type comprising a recurring unit represented by the following general formula (6) and containing the sulfonic acid group and/or carboxyl group in a proportion of about 20% or more based on the aromatic ring:

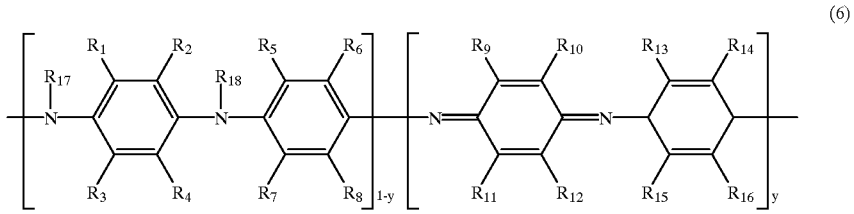

(6)

In the above formula, $0 \leq y \leq 1$, each of $R_1-R_{18}$ is independently selected from the group consisting of H, $-SO_3^-$, $-SO_3H$, $-R_{19}SO_3^-$, $-R_{19}SO_3H$, $-OCH_3$, $-CH_3$, $-C_2H_5$, $-F$, $-Cl$, $-Br$, $-I$, $-N(R1_9)_2$, $-NHCOR_{19}$, $-OH$, $-O-$, $-SR_{19}$, $-OR_{19}$, $-OCOR_{19}$, $-NO_2$, $-COOH$, $-R_{19}COOH$, $-COOR_{19}$, $-COR_{19}$, $-CHO$ and $-CN$ in which $R1_9$ is a $C_1-C_{24}$ alkyl, aryl or aralkyl group, and at least one of $R_1-R_{16}$ is a group selected from the group consisting of $-SO_3^-$, $-SO_3H$, $-R1_9SO_3^-$, $-R_{19}SO_3H$, COOH and $-R_{19}COOH$, and the proportion of rings having said group is about 20% to 100%.

Here, an electrically conducting polymer of aniline type in which the content of the sulfonic acid group and carboxyl group based on the aromatic ring is at least 50% is very good in solubility and hence preferably used, and the polymer of more preferably at least 70%, further preferably at least 90% and particularly preferably 100% is used.

The substituent which is added to the aromatic ring is preferably an electron-donative group in view of electric conductivity and solubility, and specifically, alkyl groups, alkoxy groups, halogen groups and the like are preferable, and in particular, electrically conducting polymers of aniline type having alkoxy groups are most preferable.

Among these combinations, the most preferable electrically conducting polymers of aniline type are represented by the following general formula (7):

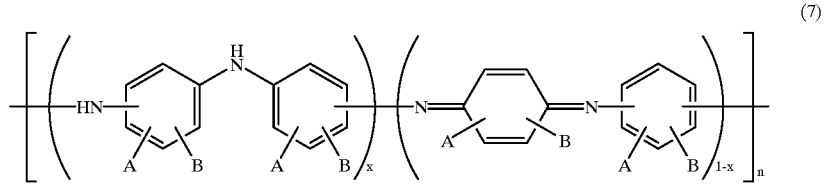

(7)

In the above formula, A represents one group selected from the group consisting of sulfonic acid group, carboxyl group and alkali metal salts, ammonium salts and substituted ammonium salts of these groups; B represents one group selected from the group consisting of alkyl groups such as methyl group, ethyl group, n-propyl group, isopropyl group, n-butyl group, isobutyl group, sec-butyl group, t-butyl group, dodecyl group, tetracosyl group and the like; alkoxy groups such as methoxy group, ethoxy group, n-propoxy group, isopropoxy group, n-butoxy group, isobutoxy group, sec-butoxy group, t-butoxy group, heptoxy group, hexoxy group, octoxy group, dodecoxy group, tetracosoxy group and the like; halogen groups such as fluoro group, chloro group, bromo group and the like; x represents any number of 0 to 1; and n represents a degree of polymerization, preferably of 3 or more.

Those having a weight average molecular weight of 2,000 or more in terms of polyethylene glycol in GPC are excellent in electric conductivity, film-formability and film strength and hence preferably used. Those of 3,000 or more to 1,000,000 or less are more preferable, and those of 5,000 or more to 500,000 or less are further preferable. Here, polymers having a weight average molecular weight of 2,000 or less are excellent in solubility, but insufficient in film-formability and electric conductivity, and polymers having a weight average molecular weight of 1,000,000 or more are excellent in electric conductivity but insufficient in solubility.

The acidic group-containing, self-doping type, soluble, electrically conducting polymer (a') includes the above-mentioned polymers (a) and the corresponding polymers in which the sulfonic acid and carboxylic group are the other acidic groups.

The thermally cross-linkable or UV- or EB-cross-linkable resin or paint (b) or (b') is not particularly limited; however, the curable resins and paints shown below are preferable:

As the thermally cross-linkable resins or paints, there are preferably used epoxy resins, oligoester acrylates, xylene resins, guanamine resins, diallyl phthalate, vinyl ester resins, phenol resins, unsaturated polyester resins, furan resins, polyimides, poly(p-hydroxybenzoic acid), polyurethanes, maleic resins, melamine resins, urea resins and the like.

As the UV- or EB-cross-linkable resins and paints, there are preferably used liquid polybutadiene compounds, unsaturated polyester compounds, polyene-polythiol compounds, cationically polymerizable compounds, aminoalkyd resins, urethane acrylate, epoxy acrylate, polyester acrylates, polyether acrylates, acrylate monomers, acrylic base resins such as acrylic oligomers, water-based acrylates and the like, etc.

As the polymerization initiator for the UV- or EB-cross-linkable resins and paints, there are used radical polymerization initiators, cationic polymerization initiators and the like. As examples of the radical polymerization initiators, there are mentioned benzophenone, acetophenone, acenaphthene quinone and benzophenone derivatives, as well as thioxanthone, benzoin ether, benzyl dimethyl ketal, α-hydroxyalkylphenones, α-aminoalkylphenones, diphenyl-(2,4,6-trimethylbenbzoyl)-phosphine oxide, acylphosphin oxides and the like. As examples of water-soluble radical polymerization initiators, there are mentioned 4-(2-hydroxyethoxy)phenyl (2-hydroxy-2-propyl) ketone, thioxanthone ammonium salt, benzophenone ammonium salt and the like. As examples of the cationic polymerization initiators, there are mentioned BrΦnsted acid generating type initiators such as diaryl iodonium salts, triaryl sulfonium salts and the like; and Lewis acid type initiators such as aryl diazonium salt, iron arene complexes and the like. In addition, cation-anion hybrid type initiators are mentioned.

The cross-linkable compound (c) (or (c')) may be any compound having in the molecule at least two functional groups capable of reacting with the sulfonic acid group and/or carboxyl group (or the acidic group) and is not particularly limited; however, there are preferably used low molecular weight compounds having at least two functional groups selected from the group consisting of hydroxyl group, silanol group, thiol group, amino group, epoxy group and these functional groups protected with a protective group and high molecular compounds having a recurring unit containing these functional groups.

In order to obtain a practically sufficient cross-linking, it is preferable that the cross-linkable compound (c) is not gasified in the drying step after the film-formation, so that the cross-linkable compound (c) has a boiling point of 30° C. or more, preferably 50° C. or more, more preferably 80° C., and particularly preferably 100° C. or more.

Examples of the cross-linkable compound (c) include low molecular weight compounds such as diols and polyols, disilanols and polysilanols, dithiols and polythiols, diamines and polyamines, epoxy compounds, melamines and ureas, sugars and the like; and high molecular compounds having as a recurring unit at least one of the vinyl type, acrylic ester type, methacrylic ester type, acrylamide type and methacrylamide type monomers having a hydroxyl group, a thiol group, a silanol group, an amino group or an epoxy group.

As specific examples of the diols and polyols, there are used the compounds shown in Polymer Data Handbook, Fundamental edition, edited by The Society of Polymer Science and published by Baifukan Jan. 30, 1986, pages 283 to 322, Table 23.1. Preferable are cycloaliphatic diols and polyols having a relatively low cross-linking temperature. Specific examples thereof include ethylene glycol, propylene glycol, 1,2-propanediol, 1,2-butanediol, 1,3-butanediol, 2,3-butanediol, 1,4-butanediol, 1,2-pentanediol, 1,3-pentanediol, 1,4-pentanediol, 1,5-pentanediol, 2,3-pentanediol, 2,4-pentanediol, 1,2-hexanediol, 1,3-hexanediol, 1,4-hexanediol, 1,5-hexanediol, 1,6-hexanediol, 2,3-hexanediol, 2,4-hexanediol, 2,5-hexanediol, diethylene glycol, triethylene glycol, tetraethylene glycol, pentaethylene glycol, hexaethylene glycol, dipropylene glycol, tripropylene glycol, thiodiethanol, 3,6-dithio-1,8-octanediol, 3,6,9-trithio-1,11-dodecanediol, 1,2-cyclopentanediol, 1,3-cyclopentanediol, 1,4-cyclopentanediol, 1,2-cyclohexanediol, 1,3-cyclohexanediol, 1,4-cyclohexanediol, 1,5-cyclohexanediol, 1,2-cyclohexanedimethanol, 1,3-cyclohexanedimethanol, 1,4-cyclohexanedimethanol, 1,5-cyclohexanedimethanol, o-methylolcyclohexanol, m-methylolcyclohexanol, p-methylolcyclohexanol, o-xylylene glycol, m-xylylene glycol, p-xylylene glycol, hydroquinone, bisphenol A, glycerin, trimethylolpropane, 1,2,3-butanetriol, 1,2,4-butanetriol, 1,2,3-pentanetriol, 1,2,4-pentanetriol, 1,2,5-pentanetriol, 2,3,4-pentanetriol, trimethylolethane, tetramethylol-methane, 1,2,3-cyclohexanetriol, 1,2,4-cyclohexanetriol, 1,2,5-cyclohexanetriol, 1,3,5-cyclohexanetriol, 1,2,3-cyclohexanetrimethanol, 1,2,4-cyclohexanetrimethanol, 1,2,5-cyclohexanetrimethanol, 1,3,5-cyclohexanetrimethanol and the like.

As specific examples of the dithiols and polythiols, there are used the compounds shown in the above-mentioned Polymer Data Handbook, Fundamental edition, pages 347 to 349, Table 25.2. Specific examples thereof include 4-ethylbenzene-1,3-dithiol, 1,2-ethanedithiol, 1,8-octanedithiol, 1,1-cyclohexanedithiol, 1,2-cyclohexanedithiol, 1,1-cyclobutanedithiol, 1,1-cyclopentanedithiol, 1,3-diphenylpropane-2,2-dithiol, 2,6-dimethyloctane-2,6-dithiol, 2,6-dimethyloctane-3,7-dithiol, 2,4-dimethylbenzene-1,3-dithiol, 4,5-dimethylbenzene-1,3-dithiol, 3,3-dimethylbutane-2,2-dithiol, 2,2-dimethylpropane-1,3-dithiol, 1,3-di(p-methoxyphenyl)-propane-2,2-dithiol, 3,4-dimethoxybutane-1,2-dithiol and the like.

As specific examples of the diamines and polyamines, there are used the compounds shown in the above-mentioned Polymer Data Handbook, Fundamental edition, pages 241 to 255, Table 21.1. Specific examples thereof include ethylenediamine, N-methylethylenediamine, N,N'-dimethylethylenediamine, N-ethylethylenediamine, N-methyl-N'-ethylethylenediamine, N,N'-diethylethylenediamine, N-propylethylenediamine, N-isopropylethylenediamine, N-butylethylenediamine, N,N'-dibutylethylenediamine, N-pentylethylenediamine, N-heptylethylenediamine, N-octylethylenediamine, 1,2-diaminopropane, N,N'-dimethyl-1,2-diaminopropane, 2,3-diaminobutane, 1,3-diamino-2-methylpropane, pentamethylenediamine, 2,3-diaminopentane, 2,4-diaminopentane, 1,3-diamino-2-methylbutane, 1,4-diamino-2-methylbutane, hexamethylenediamine, 1,4-diaminoheptane, heptamethylenediamine, 2,3-diaminoheptane, 1,6-diaminooctane, octamethylenediamine, 2,3-diaminooctane, nonamethylenediamine, decamethylenediamine, undecamethylenediamine, dodecamethylenediamine, 1,12-diaminooctadecane, 1,2-diaminocyclohexane, 1,3-diaminocyclohexane, 1,4-diaminocyclohexane, o-phenylenediamine, m-phenylenediamine, p-phenylenediamine, 4-amino-2-methylaminotoluene, 4-amino-2-ethylaminotoluene, 3-amino-4-methylbenzylamine, naphthylenediamine-(1,2), naphthylenediamine-(1,3), naphthylenediamine-(1,4), naphthylenediamine-(1,5), naphthylenediamine-(1,6), naphthylenediamine-(1,7), naphthylenediamine-(1,8), naphthylenediamine-(2,3), naphthylenediamine-(2,6), naphthylenediamine-(2,7), 4,4'-diaminostylbene, bis(4-aminophenyl)acetylene, ethylene glycol bis(2-aminophenylether), 2,2'-diaminodiphenyl ether, 2,2'-diaminodiphenyl sulfide, 2,2'-diaminodiphenylsulfone, 2,2'-diaminodiphenyl disulfide, hydroquinone bis(4-aminophenylether), 4,4'-diaminodibenzyl sulfide, 2,4-diaminonaphthol-(1), 2-hydroxybenzidine, 4,4'-diaminodiphenylcarbinol, 4,4'-diamino-3'-hydroxy-3-methyldiphenyl, 4,4'-diamino-2-hydroxytriphenyl-methane, 4,4'-diaminotriphenylcarbinol, 3,5-diaminocatechol, 2,5-diamino-9,10-dihydroxy-phenanthrene, 4,6-diaminopyrogallol, 4,6-diamino-2-methylfluoroglucine and the like.

As specific examples of the epoxy compounds, there are used the compounds shown in the above-mentioned Polymer Data Handbook, Fundamental edition, pages 194–195, Table 18.1 and 2. Specific examples thereof include 1,3-diglycidyl-5,5-dimethylhydantoin, 1,3-diglycidyl-5-methyl-5-ethylhydantoin, glycerol diglycidyl ether, N,N'-diglycidyl-5,5-dimethylhydantoin, polypropylene glycol diglycidyl ether, glycerin triglycidyl ether, trimethylolpropane triglycidyl ether and the like.

As specific examples of the melamines and ureas, there are used the compounds shown in the above-mentioned Polymer Data Handbook, Fundamental edition, pages 237 to 238, Table 20.1 and 2. Specific examples thereof include melamine, N2,N4,N6-trimethylmelamine, N4-methyl-N2-ethylmelamine, benzoguanamine, $N^2$-phenylmelamine, $N^2,N^4,N^6$- triethylmelamine, N2,$N^4$-diphenylmelamine, $N^2,N^4,N^6$-tri-(2,4-dichlorophenyl)-melamine, $N^2,N^4,N^6$-tri-(2-chlorophenyl)melamine, $N^2,N^4,N^6$-triphenylmelamine, $N^2,N^4,N^6$-tri-p-toluylmelamine, N2,$N^4,N^6$-tri-α-naphthylmelamine, $N^2,N^4,N^6$-tri-β-naphthylmelamine, hexamethoxymethylolmelamine, urea, thiourea, guanidine, semicarbazide, monoformylurea, biuret, guanylurea, monomethylolurea, oxalylurea, ethylenethiourea, ethyleneurea, monoacetylurea, carbonyldiurea, dienanthylidenetriurea and the like.

As specific examples of the sugars, there are used the compounds shown in Chemical Handbook, Fundamental edition, revised 4th edition edited by The Chemical Society of Japan and published by Maruzen Kabushiki Kaisha Sep. 30, 1993, pages I-519 to 523, Structural Formulas 18.1 to 18.105. Specific examples thereof include erythritol, D-erythrulose, D-erythrose, D-threose, D-arabinose, β-D-arabinose, β-L-arabinose, D-xylulose, L-xylulose, D-xylose, α-D-xylose, 2-deoxy-D-ribose, 2-deoxy-β-D-ribose, D-lyxose, α-D-lyxose, α-L-lyxose, D-ribulose, D-ribose, D-arabitol, ribitol, D-altrose, β-D-altrose, D-allose, β-D-allose, D-idose, D-galactose, α-D-galactose, β-D-galactose, α-L-galactose, D-quinovose, α-D-quinovose, D-glucose, α-D-glucose, β-D-glucose, D-gulose, L-sorbose, D-tagatose, D-talose, α-D-talose, 2-deoxy-D-glucose, D-fucose, D-psicose, D-fructose, galactitol, D-glucitol, D-mannitol and the like.

Those compounds whose functional group has been protected with a protective group such as ether, ester, acetal, hemiacetal or the like and the compounds shown in the above-mentioned Polymer Data Handbook, Fundamental edition, pages 194 to 207, Table 18.1 to 18.13 which produce hydroxyl group and the like upon ring-opening can also be used as the cross-linkable compounds (c).

Mentioning here all the cross-linkable compounds stated in the above publications is omitted, but the contents of the above publications are incorporated into the present specification by reference.

The monomer (A) constituting the macromolecular compound as the cross-linking compound (c) includes monomers (A) such as vinylic monomers, acrylic monomers, methacrylic monomers, acrylamide monomers, methacrylamide monomers, vinylamine monomers, silanol group-containing monomers and the like. The vinylic monomers include vinyl alcohol, allyl alcohol, vinylamine, allylamine and the like. The acrylic monomers include 2-hydroxyethyl acrylate, 2-(2-hydroxyethoxy)ethyl acrylate, 2-hydroxycyclohexyl acrylate, (1-hydroxycyclohexyl) methyl acrylate, 2-(2-hydroxy-1,1-dimethylethoxy)-1,1-dimethylethyl acrylate, 2-hydroxy-3-sulfopropyl acrylate, 2-hydroxy-3-piperidinopropyl acrylate, 2-hydroxy-3-phenylethyl acrylate, 2-hydroxy-3-phenoxypropyl acrylate, 2-hydroxybutyl acrylate, 4-hydroxybutyl acrylate, 2-hydroxypropyl acrylate, 3-hydroxypropyl acrylate, 2-hydroxy-3-(propenyloxy)propyl acrylate, 2-hydroxy-3-propoxypropyl acrylate, 2-hydroxy-2-methylpropyl acrylate, 2-hydroxy-2-methoxypropyl acrylate, 3-hydroxy-2-(methoxymethyl)-4-pentenyl-2-hydroxy-2-methylpropyl acrylate, glycidyl acrylate, 12-hydroxydodecyl acrylate, 13-hydroxytridecyl acrylate, 18-hydroxyoctadecyl acrylate, 24-hydroxytetracosyl acrylate and the like. The methacrylic monomers include 2-hydroxyethyl methacrylate, 3-hydroxybutyl methacrylate, 2-hydroxy-1-ethyl methacrylate, 2-hydroxypropyl methacrylate, glycidyl methacrylate, 12-hydroxydodecyl methacrylate, 13-hydroxytridecyl methacrylate, 18-hydroxyoctadecyl methacrylate, 24-hydroxytetracosyl methacrylate and the like. The acrylamide and methacrylamide monomers include N-(2-hydroxyphenyl)methacrylamide, N-(2-hydroxyethyl)acrylamide, N-(2-hydroxypropyl)-acrylamide, N-(1,1-dimethyl-2-hydroxyethyl)acrylamide, N-(1-ethyl-2-hydroxyethyl)acrylamide, N-(1,1-dimethyl-3-hydroxybutyl)acrylamide, N-[1,1-bis(hydroxymethyl)ethyl]acrylamide, N-[2-(hydroxy-1,1-bis(hydroxymethyl)ethyl]acrylamide, N,N-bis(2-(hydroxyethyl)acrylamide, 1-acrylamido-1-deoxy-D-glucitol, N-(2-hydroxyethyl)methacrylamide, N-(2-hydroxypropyl)methacrylamide, N-(1,1-dimethyl-2-hydroxyethyl)methacrylamide, N-(2,2-dimethyl-2-hydroxyethyl)methacrylamide, N-(1-ethyl-2-hydroxyethyl) methacrylamide, N-(1,1-dimethyl-3-hydroxypropyl) methacrylamide, N-[1,1-bis(hydroxymethyl)ethyl] methacrylamide, N-[2-hydroxy-1,1-bis(hydroxymethyl) ethyl]methacrylamide, N-(1,1-dimethyl-3-hydroxybutyl) methacrylamide, N-(2-hydroxyethyl)-N-ethyl-methacrylamide, 1-methacrylamido-1-deoxyglucitol-methacrylamide, N-(hydroxymethyl)acrylamide, N-(hydroxymethyl)methacrylamide, 12-hydroxydodecyl-methacrylamide, 13-hydroxytridecylmethacrylamide, 18-hydroxyoctadecylmethacrylamide, 24-hydroxytetracosylmethacrylamide, N,N-dimethylhydroxypropylamine-N-acrylimide, N-methylolacrylamide, N-methylolmethacrylamide, N-(hydroxymethyl)acrylamide and the like. The vinylamine monomers include the monomers shown in the above-mentioned Polymer Data Handbook, Fundamental edition, pages 170 to 173, Table 15.1. Specific examples thereof include vinylethylamine, vinylbutylamine, vinyldodecylamine, vinylbenzylamine, vinylcyclohexylamine and the like. As specific examples of the silanol group-containing monomers, there are mentioned silanol group-containing monomers obtained by hydrolyzing silyl group-containing monomers such as ethylenically unsaturated alkoxysilanes, ethylenically unsaturated acyloxysilanes and the like. Specific examples of the ethylenically unsaturated alkoxysilanes include acrylatoalkoxysilanes (for example, γ-acryloxypropyl-trimethoxysilane, γ-acryloxypropyl-triethoxysilane) and methacrylatoalkoxysilanes [for example, γ-methacryloxypropyltrimethoxysilane, γ-methacryloxypropyltriethoxysilane, γ-methacryloxypropyltris(2-methoxyethoxy)silane]. Specific examples of the ethylenically unsaturated acyloxysilanes include acrylatoacetoxysilane, methacrylatoacetoxysilane, ethylenically unsaturated acetoxysilanes (for example, acrylatopropyltriacetoxysilane, methacrylatopropyltriacetoxysilane) and the like.

In addition to the above-mentioned monomers, other monomers (B) copolymerizable with the above-mentioned monomers can also be used. The said other copolymerizable monomers (B) are not particularly limited; however, preferably, there are mentioned vinylic monomers, vinyl ether monomers, acrylic monomers, methacrylic monomers, acrylamide monomers and methacrylamide monomers. As the vinylic monomers, there are preferably used the monomers shown in the above-mentioned Polymer Data Handbook, Fundamental edition, pages 79 to 81, Table 6.1. Specific examples thereof include vinyl acetoacetate, allyl acetoacetate, vinyl acetate, vinyl (2-ethoxyethoxy)acetate, vinyl isobutyrate, vinyl butyrate and the like. As the vinyl ether monomers, there are preferably used the monomers shown in the above-mentioned Polymer Data Handbook, Fundamental edition, pages 85 to 89, Table 7.1. Specific examples thereof include alkyl vinyl ethers (the alkyl group includes methyl, ethyl, n-propyl, isopropyl, n-butyl, isobutyl, sec-butyl, tert-butyl, dodecyl, tridecyl, octadecyl, tetracosyl and the like); alkenyl vinyl ethers (the alkenyl group includes vinyl, allyl, 1-methylallyl, 2-methylallyl (methallyl), 3-methylallyl and the like), alkynyl vinyl ethers (the alkynyl group includes ethynyl (acetylenyl), propy-1-nyl, propy-2-nyl, buty-1-nyl, buty-2-nyl, buty-3-nyl and the like), aralkyl vinyl ethers (the aralkyl group includes benzyl, p-methylbenzyl and the like), phenyl vinyl ether, hydroxyalkyl vinyl ethers (the hydroxyalkyl group includes 2-hydroxyethyl, 3-hydroxypropyl, 3-hydroxybutyl, 4-hydroxybutyl, 5-hydroxypentyl, 12-hydroxydodecyl, 24-hydroxytetracosyl, diethylene glycolmono, triethylene glycolmono, 2-methoxyethyl, 2-ethoxyethyl, acetoxymethyl, 2-acetoxyethyl and the like), meso-1,2-diphenylethylene glycol methylvinyl ether, m-phenylenebis(ethylene glycol)divinyl ether, aminoalkyl vinyl ethers (the aminoalkyl group includes 2-aminoethyl, 2-dimethylaminoethyl, 2-diethylaminoethyl, 2-n-butylaminoethyl, 5-diethylaminopentyl, 1,2-diethylaminododecyl, 2,4-diethylaminotetracosyl, diethanolaminemono and the like), thioalkyl vinyl ethers (the thioalkyl group includes 2-methylthioethyl, 2-ethylthioethyl, 2-n-propylthioethyl, 2-n-butylthioethyl, 2-n-dodecylthioethyl, 2-n-tetracosylthioethyl and the like), 2-cyanoethyl vinyl monomer and the like. As the acrylic monomers, there are preferably used the monomers shown in the above-mentioned Polymer Data Handbook, Fundamental edition, pages 106 to 113, Table 10.1. Specific examples thereof include 2-acetoacetoxypropyl acrylate, ethyl acrylate, 1-ethylpropyl acrylate, 2-ethylhexyl acrylate, oxiranylmethyl acrylate, cyanomethyl acrylate, 1,1-dimethylethyl acrylate, trimethylsilyl acrylate, nonyl acrylate, phenyl acrylate, hexyl acrylate, methyl acrylate, 1-methylethyl acrylate, 1-methoxyethyl acrylate, 2-methoxyethyl acrylate and the like. As the methacrylic monomers, there are preferably used the monomers shown in the above-mentioned Polymer Data Handbook, Fundamental edition, pages 122 to 125, Table 11.1, and specific examples thereof include 1-acetylethyl methacrylate, acetylmethyl methacrylate, 2-acetoxyethyl methacrylate, 2-acetoxypropyl methacrylate, n-amyl methacrylate, tert-amyl methacrylate, allyl methacrylate, allyloxymethyl methacrylate, isoamyl methacrylate, isobutyl methacrylate, ethyl methacrylate, dimethylaminoethyl methacrylate, stearyl methacrylate, nonyl methacrylate, 2-hydroxyethyl methacrylate, 3-hydroxybutyl methacrylate, 2-hydroxy-1-ethyl methacrylate, vinyl methacrylate, n-butyl methacrylate, methyl methacrylate, 1-methylamyl methacrylate and the like. As the acrylamide and methacrylamide monomers, there are preferably used the monomers shown in the above-mentioned Polymer Data Handbook, Fundamental edition, pages 128 to 137, Table 12.1. Specific examples thereof include acrylamide, methacrylamide, N-methylacrylamide, N-ethylacrylamide, N-isopropylacrylamide, N-n-butylacrylamide, N-sec-butylacrylamide, N-isobutylacrylamide, N-tert-butylacrylamide, N-(1,1-dimethylbutyl)acrylamide, N-n-octylacrylamide, N-dodecylacrylamide, N,N-dimethylhydroxypropylamine-N-methacrylimide, N-methylmethacrylamide, N-ethylmethacrylamide, N-n-butylmethacrylamide, N-tert-butylmethacrylamide, N-allylmethacrylamide, N,N-dimethylacrylamide, N,N-diethylacrylamide, N,N-dibutylacrylamide, N,N-diisobutylacrylamide, N-(methoxymethyl)acrylamide, N-(ethoxymethyl)acrylamide, N-(n-propoxymethyl)acrylamide, N-(isopropoxymethyl)acrylamide, N-(n-butoxymethyl)acrylamide, N-(isobutoxymethyl)acrylamide, N-(allyloxymethyl)acrylamide, N-[(2-cyanoethyl)oxymethyl]acrylamide, N-methylmethacrylamide, N,N'-methylenebismethacrylamide, N-(2-dimethylaminoethyl)acrylamide, N-(2-diethylaminoethyl)acrylamide, N-(4-dimethylamino-butyl)acrylamide, N-(3-dimethylaminopropyl)methacrylamide, N-(2,2-dimethyl-3-dimethylaminopropyl)methacrylamide, N-(3-methylaminopropyl)methacrylamide, 2-acrylamidopropanesulfonic acid, 2-acrylamido-n-butanesulfonic acid, 2-acrylamido-n-hexanesulfonic acid, N-formyl-acrylamide, N-acetyl-acrylamide, N-(2-oxopropyl)-acrylamide, N-(1-methyl-2-oxopropyl)acrylamide, N-(1-isobutyl-2-oxopropyl)acrylamide, ethyl-2-acrylamidoacetate, diethyl-N-acryloyliminobisacetate, acryloyldicyandiamide, methacryloyldicyandiamide and the like. Among the said other copolymerizable monomers (B), preferably used are methacrylate esters such as methyl methacrylate, ethyl methacrylate, butyl methacrylate, dodecyl methacrylate, tetracosyl methacrylate and the like and acrylate esters such as methyl acrylate, ethyl acrylate, butyl acrylate, dodecyl acrylate, tetracosyl acrylate and the like. In order to enhance the adhesiveness to a substrate and the like, anionic group-containing monomers may be used.

Mentioning here all the compounds stated in the above publication is omitted; however, the contents of the above publication are incorporated into the present specification by reference.

The copolymerization ratio of the monomer (A) of the copolymer is not particularly limited; however, it is preferably at least 0.01 mole %, more preferably at least 0.1 mole %, further preferably at least 1 mole %, and particularly preferably at least 5 mole %.

The high molecular compound as the cross-linkable compound (c) is used in the form of a solution formed by dissolving in a solvent or in the form of an emulsion formed by dispersing in a suitable solvent. To this emulsion can be added a general resin which is usually used in such a dispersion. Also, if necessary, various binders may be mixed and used. As the binder used, there are mentioned resins such as acrylic resin, methacrylic resin, polyester resin, vinyl chloride resin, vinyl acetate resin, ethylene resin and the like.

The cross-linkable, electrically conductive composition and anticorrosion composition of this invention are a composition comprising the soluble, electrically conducting polymer (a) and the thermally cross-linkable or UV- or EB-cross-linkable resin or paint (b) and/or the cross-linkable compound (c) as the main components, these being, if necessary, dissolved in the solvent (d).

Specifically, it is a composition obtained by dissolving or dispersing the soluble, electrically conducting polymer (a) in a solution of the thermally cross-linkable or UV- or EB-cross-linkable resin or paint (b) or a solution obtained by dissolving this solution in a suitable solvent (d); a composition obtained by dissolving or dispersing the soluble, electrically conducting polymer (a) in a solution or emulsion obtained by dissolving or dispersing the cross-linkable compound (c) in a suitable solvent (d), respectively; or a composition obtained by dissolving or dispersing the soluble, electrically conducting polymer (a) in a solution obtained by dissolving the thermally cross-linkable or UV- or EB-cross-linkable resin or paint (b) and the compound (c) in a suitable solvent (d).

As to the solvent (d), it is preferable that the solvent in which the soluble, electrically conducting polymer (a) is dissolved is different from the solvent in which the soluble, electrically conducting polymer (a) is dispersed.

When the soluble, electrically conducting polymer (a) is dissolved, the solvent (d) may be a solvent capable of dissolving the soluble, electrically conducting polymer (a), the thermally cross-linkable or UV- or EB-cross-linkable resin or paint (b) and/or the cross-linkable compound (c) and it is not particularly limited. However, preferably used are water, alcohols such as methanol, ethanol, isopropyl alcohol, propyl alcohol, butanol and the like; ethylene glycols such as ethylene glycol, ethylene glycol methyl ether, ethylene glycol ethyl ether, diethylene glycol methyl ether, diethylene glycol ethyl ether, diethylene glycol butyl ether, diethylene glycol dimethyl ether, diethylene glycol diethyl ether and the like; propylene glycols such as propylene glycol, propylene glycol methyl ether, propylene glycol ethyl ether, propylene glycol butyl ether, propylene glycol dimethyl ether, propylene glycol diethyl ether and the like; ethyl lactate; dimethylformamide; dimethylacetamide; N-methylpyrrolidone; and the like, and a mixed solvent of them may be used.

The solvent (d) used for dispersing the soluble, electrically conducting polymer (a) may be any solvent capable of dissolving the thermally cross-linkable UV- or EB-cross-linkable resin or paint (b) and/or the cross-linkable compound (c), and is not particularly limited. However, preferably used are aromatic hydrocarbon organic solvents such as benzene, toluene, ethylbenzene, propylbenzene, t-butylbenzene, o-xylene, m-xylene, p-xylene, tetralin, decalin and the like; alcohol type organic solvents such as methyl alcohol, ethyl alcohol, n-propyl alcohol, i-propyl alcohol, n-butyl alcohol, i-butyl alcohol, n-hexyl alcohol, n-octyl alcohol, i-octyl alcohol, 2-ethylhexyl alcohol and the like; propylene glycol alkyl ether type organic solvents such as propylene glycol methyl ether, propylene glycol dimethyl ether, propylene glycol ethyl ether, propylene glycol diethyl ether, propylene glycol n-propyl ether, propylene glycol i-propyl ether, propylene glycol di-n-propyl ether, propylene glycol di-i-propyl ether, propylene glycol n-butyl ether, propylene glycol i-butyl ether, propylene glycol di-n-butyl ether, propylene glycol di-i-butyl ether and the like; ketone type organic solvents such as acetone, methyl ethyl ketone, methyl isobutyl ketone, methyl amyl ketone, cyclohexanone and the like; ester type organic solvents such as methyl acetate, ethyl acetate, n-butyl acetate, amyl acetate and the like; Cellosolve type organic solvents such as methyl Cellosolve, ethyl Cellosolve, i-propyl Cellosolve, n-butyl Cellosolve, phenyl Cellosolve, benzyl Cellosolve and the like; carbitol type organic solvents such as methyl carbitol, ethyl carbitol, n-propyl carbitol, i-propyl carbitol, n-butyl carbitol, i-butyl carbitol, i-amyl carbitol, phenyl carbitol, benzyl carbitol and the like; hydroxy ester type organic solvents such as ethyl lactate, methyl lactate and the like; etc.

The composition ratio of the components (a), (b), (c) and (d) of the cross-linkable, electrically conducting composition or anticorrosion composition containing the solvent (d) is such that, per 100 parts by weight of the solvent (d), (a)+(b), (a)+(c) or (a)+(b)+(c) is preferably 0.01 to 500 parts by weight, more preferably 0.1 to 200 parts by weight, and further preferably 0.5 to 100 parts by weight.

In order to lower the dispersibility and surface tension of the cross-linkable, electrically conductive composition or anticorrosion composition of this invention, various additives can further be added to the composition. As the additives, a surfactant, a blocking agent and the like are mentioned. The surfactant may be any one as far as it does not obstruct the dissolution or dispersion of the cross-linkable, electrically conductive composition or anticorrosion composition of this invention, and is not particularly limited. There are used anionic, cationic and nonionic surfactants, and preferable are anionic and nonionic surfactants. The nonionic surfactant includes, for example, polyoxyalkylene alkyl ethers such as polyoxyethylene lauryl ether, polyoxyethylene stearyl ether and the like; polyoxyalkylene alkylphenyl ethers such as polyoxyethylene octylphenyl ether, polyoxyethylene nonylphenyl ether and the like; sorbitan fatty acid esters such as sorbitan monolaurate, sorbitan monostearate, sorbitan trioleate and the like; polyoxyalkylene sorbitan fatty acid esters such as polyoxyethylene sorbitan monolaurate and the like; polyoxyalkylene fatty acid esters such as polyoxyethylene monolaurate, polyoxyethylene monostearate and the like; glycerin fatty acid esters such as oleic acid monoglyceride, stearic acid monoglyceride and the like; polyoxyethylene-polypropylene block copolymers; and the like. The anionic surfactant includes, for example, fatty acid salts such as sodium stearate, sodium oleate, sodium laurate and the like; alkylarylsulfonic acid salts such as sodium dodecylbenzenesulfonate and the like; alkylsulfuric acid ester salts such as sodium laurylsulfate and the like; alkylsulfosuccinic acid ester salts and their derivatives such as sodium monooctylsulfosuccinate, sodium dioctylsulfosuccinate, sodium polyoxyethylene laurylsulfosuccinate and the like; polyoxyalkylene alkyl ether sulfuric acid ester salts such as sodium polyoxyethylene lauryl ether sulfate and the like; polyoxyalkylene alkylaryl ether sulfuric acid ester salts such as sodium polyoxyethylene nonylphenyl ether sulfate and the like; etc. The cationic surfactant includes, for example, alkylamine salts such as laurylamine acetate and the like; quaternary ammonium salts such as lauryltrimethylammonium chloride, alkylbenzyldimethylammonium chloride and the like; polyoxyethylalkyl-amines; and the like. When the surfactant is used, the amount of the surfactant used is preferably 0 to 5% by weight, preferably 0 to 3%, based on the total of the cross-linkable, electrically conductive composition or anticorrosion composition. When the amount exceeds 3% by weight, the water resistance and strength of the thin film obtained are inferior in some cases. The blocking agent includes aliphatic hydrocarbon type blocking agents such as liquid paraffin having 16 or more carbon atoms, microcrystalline wax, natural paraffin, synthetic paraffin, polyolefin wax and their partial oxides, fluorides and chlorides; higher aliphatic alcohol/higher fatty acid type blocking agents such as higher aliphatic alcohol having 16 or more carbon atoms/higher fatty acid and the like; metal soap type blocking agents such as metal salts of fatty acids having 10 or more carbon atoms and the like; fatty acid ester type block agents; fatty acid amide type blocking agents; fluorine-containing block agents and the like.

The proportions of the soluble, electrically conducting polymer (a) and the cross-linkable compounds (b) and/or (c) is such that (b)/(a), (c)/(a) or [(b)+(c)]/(a) is 0.01/100 to 9900/100, preferably 0.1/100 to 900/100, and more preferably 1/100 to 800/100. When the ratio of (b), (c) or (b)+(c) to (a) exceeds 9900/100, no practical electric conductivity and anticorrosive property are obtained, and when it is less than 0.01/100, the cross-linking becomes insufficient and the solvent resistance and water resistance become inferior.

In addition, the anticorrosive composition of this invention can be used in admixture with a conventional corrosion-preventing agent (for example, a corrosion-preventing pigment such as a phosphate- or borate-containing pigment or a metal oxide pigment, or another organic or inorganic corrosion inhibitor, for example, a salt of nitroisophthalic acid, a phosphor-containing ester, an industrial amine, a substituted benzotriazole or the like).

The cross-linkable, electrically conductive composition or anticorrosion composition of this invention is formed by coating on the surface of a substrate and thereafter heating and drying. As the coating method, there is used a method such as spin coating, dip coating, cast coating, roll coating, spraying or the like. The coating may be applied to a film before orientation, a film after monoaxial orientation or biaxial orientation, a plastic before molding, and a plastic after molding. The substrate includes various plastics and films such as various polyesters, polypropylene, polyethylene, poly(vinyl chloride), polystyrene, polycarbonate, epoxy resin, nylon, fluorocarbon resin, polysulfone, polyimide, silicone resin, polyurethane, synthetic paper, phenol resin and the like; paper, and substantially all metals and metal alloys such as iron, aluminum, copper, zinc, nickel, silver, cobalt, lead, chromium, titanium, stainless steel and the like. The heating and drying temperature is usually 50° C. or more, preferably 60° C. to 500° C., and more preferably 80° C. to 400° C.

The thickness of the anticorrosive film is usually 0.001 to 1,000 μm, preferably 0.005 to 500 μm, and more preferably 0.01 to 100 μm.

After the formation of a film by the above method, the cross-linkable composition is insolubilized in water or a solvent by heating or irradiation with an ionizing radiation or a combination of them.

The temperature for cross-linking is preferably 80° C. or more, more preferably 100° C. to 500° C. and further preferably 120° C. to 400° C. As the ionizing radiation used for the cross-linking, there are preferably used ultraviolet ray (UV), far ultraviolet ray, electron beam (EB), proton beam and the like. It is also effective to use them in combination.

The temperature at which the cross-linkable (b) is cross-linked with the soluble, electrically conducting polymer (a) is varied depending upon the kind of the cross-linkable compound (b) and is as shown in the following Table 1.

TABLE 1

| Classification | Name of compound | Cross-linking starting temp. |
| --- | --- | --- |
| Polyol | Polyvinyl alcohol | about 130° C. |
|  | MNA-HEMA[1]) copolymer emulsion | about 130° C. |
| Cycloaliphatic diol | 1,4-Cyclohexanediol | about 150° C. |
|  | 1,4-Cyclohexanedimethanol | about 150° C. |
| Sugar | Glucose | about 180° C. |
| Acyclic aliphatic diol | Diethylene glycol | about 200° C. |
| Aromatic diol | Bisphenol A | about 200° C. |

1): Methyl methacrylate-hydroxyethyl methacrylate

The cross-linkable, electrically conductive composition of this invention comprising the soluble, electrically conducting polymer (a) and the cross-linkable compound (b) and/or the cross-linkable compound (c) may be a system in which (a) is dissolved or dispersed in (b) and/or (c), or a system in which (a) and (b) and/or (c) are dissolved in the solvent (d), or a system in which (b) and/or (c) is dispersed in a system consisting of (a) and the solvent (d). When a system in which the cross-linkable compound (b) and/or (c) is dispersed is used and formed into, for example, a coating film, it follows that a part of the particles of (b) and/or (c) is covered with (a) and only a part of the surface layer of the particle is cross-linked, so that the layer is insolubilized as a whole, but the cross-linking reaction does not proceed to the interior of the particle and hence the lowering of electric conductivity becomes very small, which is very preferable.

The cross-linkable, electric conductor or anticorrosion film of this invention can be formed by coating the cross-linkable, electrically conductive composition or anticorrosion composition of this invention on at least one surface of the substrate by a simple method such as a spray coating method, a dip coating method, a roll coating method, a gravure coating method, a reverse coating method, a roll brush coating method, an air-knife coating method, a curtain coating method or the like. The coating may be effected in the course of producing a polyester film, a polypropylene film, a nylon film, a metal plate or the like as the substrate, for example, in a step such as the monoaxial orientation method, the biaxial orientation method or the like, or may be applied to the film which has been subjected to orientation treatment.

This invention is explained in more detail below referring to Examples; however, the Examples do not limit the scope of this invention.

Measurement Method

In the measurement of molecular weight distribution and molecular weight, GPC measurement (polyethylene oxide-reduced) was conducted using a GPC column for water solvent (one TSK-GEL G-5000PWKL column manufactured by TOSOH CORP. and one TSK-GEL G-3000PWXL manufactured by the same company were connected in series). As the column, three kinds of columns for water were connected and used. Furthermore, as the eluting solution, a 0.2 mole/liter phosphate buffer solution was used.

As to the conductivity, a four-terminal method was used for the measurement of electric conductivity and a two-terminal method was used for the measurement of surface resistance.

Synthesis of Electrically Conducting Polymer having Sulfonic Acid Group and Carboxyl Group

REFERENCE EXAMPLE 1

Synthesis of poly(2-sulfo-5-methoxy-1,4-iminophenylene) (I)

In a 4 moles/liter aqueous ammonia solution was dissolved with stirring 100 millimoles of 2-aminoanisole-4-sulfonic acid and thereto was dropwise added an aqueous solution of 100 millimoles of ammonium peroxodisulfate. After completion of the dropping, stirring was further effected at 25° C. for 12 hours, and thereafter, the reaction product was separated by filtration, washed and dried, to obtain 15 g of a polymer powder. The volume resistivity of this polymer was 9.0 Ωcm.

REFERENCE EXAMPLE 2

Synthesis of poly(2-sulfo-1,4-iminophenylene) (II)

Poly(2-sulfo-1,4-iminophenylene) (II) was synthesized according to a known method [J. Am. Chem. Soc., (1991), 113, 2665–2666]. The content of the sulfonic acid group obtained was 52% based on the aromatic ring. The volume resistivity of the compound (II) was 50 Ωcm.

REFERENCE EXAMPLE 3

Synthesis of poly(N-sulfopropyl-1,4-iminophenylene) (III)

Poly(N-sulfopropyl-1,4-iminophenylene) (III) was synthesized according to a known method [J. Chem. Soc., Chem. Commun., 1990, 180].

REFERENCE EXAMPLE 4

Synthesis of poly(sulfopropyl-2,5-thienylene) (IV)

Poly(sulfopropyl-2,5-thienylene) (IV) was synthesized according to a known method [The 39th Preprint of The Society of Polymer Science, Japan, 1990, 561].

REFERENCE EXAMPLE 5

Synthesis of poly(2-carbonyl-1,4-iminophenylene) (V)

In a 4 moles/liter aqueous ammonia solution was dissolved with stirring 100 millimoles of 2-aminoanisole-4-carboxylic acid at 25° C., and thereto was dropwise added an aqueous solution of 100 millimoles of ammonium peroxodisulfate. After completion of the dropping, stirring was further effected at 25° C. for 12 hours and thereafter the reaction product was separated by filtration, washed and dried, to obtain 10 g of a polymer powder.

Preparation of Cross-linkable, Electrically Conductive Composition

EXAMPLES 1 TO 30 AND COMPARATIVE EXAMPLES 1 AND 2

The soluble, electrically conducting polymer (a) synthesized in Reference Examples 1 to 5 and the cross-linkable compound (b) and/or (c) were dissolved in a solvent (d) to prepare a cross-linkable, electrically conductive composition.

Examples 1 to 10 are examples of preparing a homogeneous composition in which the soluble, electrically conducting polymer (a) and the cross-linkable compound (c) are dissolved together in the solvent (d) and Examples 11 to 14 are examples of preparing a heterogenous composition in which the soluble, electrically conducting polymer (a) is dissolved in the solvent (d), but the cross-linkable compound (c) is suspended. Examples 15 to 20 are examples of a preparing homogeneous composition in which the soluble, electrically conducting polymer (a) and the cross-linkable compound (b) are dissolved together in the solvent (d) or a heterogenous composition in which the cross-linkable compound (b) is suspended. Examples 21 to 25 are examples of preparing a composition in which the soluble, electrically conducting polymer is dispersed in a system in which the cross-linkable compound (b) is dissolved in the solvent (d). Examples 26 to 30 are examples of preparing a homogeneous composition in which the soluble, electrically conducting polymer (a) and the cross-linkable compounds (b) and (c) are dissolved together in the solvent (d) or a heterogenous composition in which the cross-linkable (b) is suspended in the solvent (d). Comparative Examples 1 and 2 are examples in which the cross-linkable compounds are not added and a compound having no cross-linkability is substituted for the cross-linkable compound, respectively.

This composition was coated on a glass substrate or a polyethylene terephthalate (PET) film substrate, and thereafter, dried at 80° C. This substrate was cross-linked under the predetermined conditions and thereafter dipped in water and acetone to evaluate the water resistance and solvent resistance. The results thereof are shown in Tables 2 to 8.

TABLE 2

| Example No. | Polymer (a) | Cross-linkable compound (c) | Solvent (d) | Additive | Cross-linking conditions | Electric conductivity ($\Omega/\square$) | Solvent or water resistance | |
|---|---|---|---|---|---|---|---|---|
| | | | | | | | Water | Acetone |
| 1 | I 5 wt. parts | PVA[1]) 0.5 wt. part | Water 100 wt. parts | PEG-octyl phenyl ether | 150° C. × 5 min | $5 \times 10^5$ | ◉ | ◉ |
| 2 | I 2.5 wt. parts | PVA 2.5 wt. parts | Water/IPA[2]) = 7/3 100 wt. parts | Leveling agent | 120° C. × 10 min | $1 \times 10^7$ | ◉ | ◉ |
| 3 | I 5 wt. parts | Hexamethoxy-methylol-melamine 0.5 wt. part | Water 100 wt. parts | — | 200° C. × 5 min | $2 \times 10^7$ | ◉ | ◉ |
| 4 | I 5 wt. parts | 1,4-Cyclo-hexanediol 1 wt. part | Water 100 wt. parts | — | 180° C. × 5 min | $1 \times 10^6$ | ◉ | ◉ |

TABLE 3

| Example No. | Polymer (a) | Cross-linkable compound (b) or (c) | Solvent (d) | Additive | Cross-linking conditions | Electric conductivity ($\Omega/\square$) | Solvent or water resistance | |
|---|---|---|---|---|---|---|---|---|
| | | | | | | | Water | Acetone |
| 5 | I 5 wt. parts | Glucose 1 wt. part | Water 100 wt. parts | — | 200° C. × 5 min | $3 \times 10^6$ | ◉ | ◉ |
| 6 | II 5 wt. parts | 1,4-Cyclo-hexanediol 1 wt. part | Water/IPA = 6/4 100 wt. parts | $NH_3$ 0.2 wt. part | 180° C. × 10 min | $1 \times 10^7$ | ◉ | ◉ |
| 7 | II 5 wt. parts | Diethylene glycol 1 wt. part | Water 100 wt. parts | — | 230° C. × 10 min | $5 \times 10^6$ | ◉ | ◉ |

TABLE 3-continued

| Example No. | Polymer (a) | Cross-linkable compound (b) or (c) | Solvent (d) | Additive | Cross-linking conditions | Electric conductivity ($\Omega/\square$) | Solvent or water resistance Water | Acetone |
|---|---|---|---|---|---|---|---|---|
| 8 | III 5 wt. parts | PVA 1 wt. part | Water/DMF[4] = 5/5 100 wt. parts | — | 200° C. × 10 min | $1 \times 10^6$ | ⊚ | ⊚ |
| 9 | IV 5 wt. parts | PVA 1 wt. part | Water 100 wt. parts | — | UV[5] cure (120° C.) 5 min | $7 \times 10^6$ | ⊚ | ⊚ |

TABLE 4

| Example No. | Polymer (a) | Cross-linkable compound (c) | Solvent (d) | Additive | Cross-linking conditions | Electric conductivity ($\Omega/\square$) | Solvent or water resistance Water | Acetone |
|---|---|---|---|---|---|---|---|---|
| 10 | V 5 wt. parts | PVA 1 wt. part | Water 100 wt. parts | — | Electron beam 5 min | $5 \times 10^6$ | ⊚ | ⊚ |
| Comp. Ex. 1 | I 5 wt. parts | — | Water 100 wt. parts | — | 150° C. × 5 min | $3 \times 10^6$ | X | X |

TABLE 5

| Example No. | Polymer (a) | Cross-linkable compound (c) | Solvent (d) | Additive | Cross-linking conditions | Electric conductivity ($\Omega/\square$) | Solvent or water resistance Water | Acetone |
|---|---|---|---|---|---|---|---|---|
| 11 | I 0.5 wt. parts | PVA/polyester emulsion (Vylonal MD-1200, trade name of TOYOBO) = 1/9 2 WT. PARTS | Water 100 wt. parts | — | 150° C. × 5 min | $1 \times 10^7$ | ⊚ | ⊚ |
| 12 | I 1 wt. part | MMA[6]/HEMA[7] copolymer (1/9) emulsion 3 wt. parts | Water/IPA = 8/2 100 wt. parts | Polyoxyethylene nonyl phenyl ether | 200° C. × 5 min | $5 \times 10^7$ | ⊚ | ⊚ |
| 13 | I 0.3 wt. parts | MMA/HEA[8]) = 9/1 copolymer emulsion 0.7 wt. part | Water 100 wt. parts | — | 180° C. × 5 min | $1 \times 10^7$ | ⊚ | ⊚ |

TABLE 6

| Example No. | Polymer (a) | Cross-linkable compound (c) | Solvent (d) | Additive | Cross-linking conditions | Electric conductivity ($\Omega/\square$) | Solvent or water resistance Water | Acetone |
|---|---|---|---|---|---|---|---|---|
| 14 | I 1 wt. part | Poly(vinyl acetate) emulsion (Pegal 365, trade name | Water 100 wt. parts | Polyoxyethylene octyl phenyl ether | 150° C. × 3 min | $3 \times 10^6$ | ⊚ | ⊚ |

TABLE 6-continued

| Example No. | Cross-linkable Polymer (a) | compound (c) | Solvent (d) | Additive | Cross-linking conditions | Electric conductivity ($\Omega/\square$) | Solvent or water resistance Water | Acetone |
|---|---|---|---|---|---|---|---|---|
| Comp. Ex. 2 | I 0.5 wt. part | Water-soluble polyester resin (Vylonal MD-1200, trade name of TOYOBO) 2 wt. parts | Water 100 wt. parts | — | 150° C. × 5 min | $3 \times 10^7$ | X | ⊚ |

(of Koatsu Gas Chemical 4 wt. parts)

TABLE 7

| Example No. | Cross-linkable Polymer (a) | compound (b), (c) | Solvent (d) | Additive | Cross-linking conditions | Electric conductivity ($\Omega/\square$) | Solvent or water resistance Water | Acetone |
|---|---|---|---|---|---|---|---|---|
| 15 | I 3 wt. parts | Water-soluble polyester resin (Arastrer-300 trade name of Arakawa Kagaku) | Water 100 | Polyoxyethylene nonyl phenyl ether | 200° C. × 5 min | $3 \times 10^7$ | ○ | ○ |
| 16 | I 3 wt. parts | Water-soluble polyester (Byronal MD-1200 trade name of TOYOBO) | Water/ IPA = 9/1 | — | 180° C. × 1 min | $3 \times 10^7$ | ○ | ○ |
| 17 | I 5 wt. parts | Water-based acrylic emulsion (Nikasoi RX 301c, trade name of NIPPON CARBIDE INDUSTRIES CO., INC.) | Water 100 | Sodium mono-octyl-sulfosuccinate | 150° C. × 3 min | $9 \times 10^6$ | ○ | ○ |
| 18 | I 3 wt. parts | Electron beam-curable acrylic resin emulsion (Microcryl, trade name of TOYO INK) | Water/ IPA = 8/2 | — | Electron beam 5 min | $8 \times 10^7$ | ○ | ○ |
| 19 | I 3 wt. parts | Water-based vinylidene emulsion (DX-301, trade name of Toa Gosei) | Water/ IPA = 9/1 | Barium stearate | 180° C. × 1 min | $8 \times 10^7$ | ○ | ○ |
| 20 | I 5 wt. parts | UV-curable emulsion (NK-oligo UA-W63, trade name of Shin Nakamura Kagaku) | Water/ IPA = 8/2 | — | UV-cure (120° C. × 3 min) | $8 \times 10^7$ | ○ | ○ |
| 21 | II 5 wt. parts | Acrylic resin (Dianal SE, trade name of Mitsubishi Rayon) | Xylene | — | 120° C. × 5 min | $6 \times 10^7$ | ○ | ○ |
| 22 | II 3 wt. parts | Electron beam-curable resin (Diabeam, trade name of Mitsubishi Rayon) | Xylene | — | Electron beam 3 min | $8 \times 10^7$ | ○ | ○ |

TABLE 8

| Example No. | Cross-linkable Polymer (a) | compound (b), (c) | Solvent (d) | Additive | Cross-linking conditions | Electric conductivity ($\Omega/\square$) | Solvent or water resistance Water | Acetone |
|---|---|---|---|---|---|---|---|---|
| 23 | I 5 wt. parts | Acrylic resin (Dianal SE, trade name of Mitsubishi Rayon) | Xylene | Oleic acid | 130° C. × 3 min | $5 \times 10^7$ | ○ | ○ |
| 24 | I 3 wt. parts | Electron beam-curable resin (Diabeam, trade name of Mitsubishi Rayon) | Toluene | — | UV-cure (120° C. × 3 min) | $9 \times 10^7$ | ○ | ○ |
| 25 | I 3 wt. parts | Polyester type resin (Diaclone ER, trade name of Mitsubishi Rayon) | Ethyl benzene | — | 110° C. × 5 min | $8 \times 10^7$ | ○ | ○ |
| 26 | I 3 wt. parts | Water-soluble polyester resin (Arastar 300, trade name of Arakawa Kagaku/PVA = 9/1 | Water | Sodium dioctylsulfosuccinate | 150° C. × 5 min | $5 \times 10^7$ | ◎ | ◎ |
| 27 | I 5 wt. parts | Water-based acrylic resin emulsion (Nikazole RX-301c, trade name of NIPPON CARBIDE INDUSTRIES CO., INC.)/PVA = 9/1 | Water/IPA = 9/1 | Polyethylene glycol n-p-octyl phenyl ether | 180° C. × 1 min | $3 \times 10^6$ | ◎ | ◎ |
| 28 | I 3 wt. parts | Electron bema-curable emulsion (Microcril, MG, trade name of TOYO INK)/PVA = 9/1 | Water | Polyoxyethylene minostealate | Electron beam | $3 \times 10^7$ | ◎ | ◎ |
| 29 | I 5 wt. parts | Water-based emulsion (DX-301, trade name of TOAGOSEI)/PVA = 9/1 | Water | Dodecylbenzenesulfonic acid | 150° C. × 3 min | $5 \times 10^7$ | ◎ | ◎ |
| 30 | I 10 wt. parts | UV-Curable emulsion (NK oligo UA-W63, trade name of Shin Nakamura Kagaku) | Water | — | UV-cure (120° C. × 3 min) | $1 \times 10^6$ | ◎ | ◎ |

1) PVA: Poly(vinyl alcohol)
2) IPA: Isopropanol
3) PEG: Polyethylene glycol
4) DMF: N,N-dimethylformamide
5) UV: Ultraviolet rays
6) MMA: Methyl methacrylate
7) HEMA: Hydroxyethyl methacrylate
8) HEA: Hydroxyethyl acrylate
9) Water-soluble polyester resin: MD-1200, a trade name of TOYOBO CO., LTD. in which 1 to 10% of a sulfonic acid group or a carboxyl group had been introduced into the polyester main chain.
10) ◎: Not dissolved at all during dipping, ○: somewhat colored during dipping, Δ: a part of film was peeled during dipping, ×: completely peeled.

EXAMPLES 31 TO 63 AND COMPARATIVE EXAMPLES 3 TO 6

The acidic group-containing, self-doping type, soluble, electrically conducting polymer (a') synthesized in Reference Examples 1 to 5 and the cross-linkable compound (b') and/or (c') were dissolved in a solvent (d) to prepare an anticorrosive composition.

Examples 31 to 40 are examples of preparing a homogeneous composition in which the acidic group-containing, self-doping type, soluble, electrically conducting polymer (a') and the cross-linkable compound (c') are dissolved together in the solvent (d), Examples 41 to 47 are examples of preparing a heterogenous composition in which the acidic group-containing, self-doping type, soluble, electrically conducting polymer (a') is dissolved in the solvent (d) but the cross-linkable compound (c') is suspended. Examples 48 to 53 are examples of preparing a homogeneous composition in which the acidic group-containing, self-doping type, soluble, electrically conducting polymer (a') and the cross-linkable compound (b') are dissolved together in the solvent (d) or a heterogenous composition in which the cross-linkable compound (b') is suspended. Examples 54 to 58 are examples of preparing a composition in which the cross-linkable compound (b') is dissolved in the solvent (d) but the acidic group-containing, self-doping type, soluble, electrically conducting polymer (a') is dispersed. Examples 59 to 63 are examples of preparing a homogenous composition in which the acidic group-containing, self-doping type, soluble, electrically conductive polymer (a') and the cross-linkable compounds (b') and (c') are together dissolved in the solvent (d) or a heterogenous composition in which the cross-linkable compound (b') is suspended in the solvent (d).

The anticorrosive composition thus obtained was coated on a zinc-plated steel plate (50 mm×100 mm×1 mm) by a roll coating method or a spin coating method and treated under the cross-linking conditions shown in Tables 9 to 14 to form a coating film having the given thickness. The test plate was cut at the positions of 5 mm from both ends of the long side and subjected to spray-treatment with a sodium chloride solution at 35° C. (according to JIS-K-5400 method), and thereafter to measurement of corrosion length from the ends.

In Comparative Examples 3 to 6, the compositions shown in Table 14 were used to form films on zinc-plated steel plates in the same manner as in Examples 31 to 63 and the coated plates were subjected to the same corrosion test as in the Examples.

The results obtained in Examples 31 to 63 are shown in Tables 9 to 13 and the results obtained in Comparative Examples 3 to 6 are shown in Table 14.

In Tables 9 to 14, the abbreviations used are as follows:
PVA: Polyvinyl alcohol
PEG-OP: Polyethylene glycol octyl phenyl ether
IPA: Isopropanol
HMMM: Hexamethoxymethylolmelamine
1,4-CHDO: 1,4-Cyclohexanediol
1,4-CHDM: 1,4-Cyclohexanedimethanol
DEG: Diethylene glycol
DMF: N,N-Dimethylformamide
UV: Ultraviolet ray
PEG-NP: Polyethylene glycol nonyl phenyl ether
MMA: Methyl methacrylate
HEMA: Hydroxyethyl methacrylate
HEA: Hydroxyethyl acrylate
PEG: Polyethylene glycol
BA: n-Butyl acrylate
MAA: Methacrylic acid
NMMA: N-Methoxymethylacrylamide
EA: Ethyl acrylate
DAA: Diacetone acrylamide
NMP: N-Methyl-2-pyrrolidone

TABLE 9

| Ex. No. | Polymer (a') | Cross-linkable compound (b' or c') | Solvent (d) | Additive | Cross conditions | Film-thickness (μm) | Corrosion length (mm) |
|---|---|---|---|---|---|---|---|
| 31 | (I) 5 wt. parts | PVA 0.5 wt. part | Water 100 wt. parts | PEG-OP 0.2 wt. part | 150° C. 5 min | 2 | 1.0 |
| 32 | (I) 2.5 wt. parts | PVA 2.5 wt. parts | Water/IPA = 7/3 100 wt. parts | Levering agent 0.5 wt. part | 120° C. 10 min | 1 | 1.5 |
| 33 | (I) 0.5 wt. part | HMMM 0.05 wt. part | Water 100 wt. parts | None | 200° C. 5 min | 0.2 | 1.5 |
| 34 | (I) 0.1 wt. part | 1,4-CHDO 0.02 wt. part | Water 100 wt. parts | None | 180° C. 5 min | 0.1 | 1.5 |
| 35 | (I) 0.5 wt. part | Glucose 0.1 wt. part | Water 100 wt. parts | None | 200° C. 5 min | 0.2 | 1.5 |
| 36 | (II) 1 wt. part | 1,4-CHDM 0.2 wt. part | Water/IPA = 6/4 100 wt. parts | NH3 0.2 wt. part | 180° C. 10 min | 0.5 | 2.0 |
| 37 | (II) 5 wt. parts | DEG 1 wt. part | Water 100 wt. parts | None | 230° C. 10 min | 2 | 1.5 |
| 38 | (III) 1 wt. part | PVA 0.2 wt. part | Water/DMF = 5/5 100 wt. parts | None | 200° C. 10 min | 1 | 2.0 |
| 39 | (IV) 5 wt. parts | PVA 1 wt. part | Water 100 wt. parts | None | UV-curing 120° C. 5 min | 2 | 2.0 |
| 40 | (V) 5 wt. parts | PVA 1 wt. part | Water 100 wt. parts | None | EB-curing 5 min | 2 | 1.5 |

TABLE 10

| Ex. No. | Polymer (a') | Cross-linkable compound (b' or c') | Solvent (d) | Additive | Cross linking conditions | Film thickness (μm) | Corrosion length (mm) |
|---|---|---|---|---|---|---|---|
| 41 | (I) 0.5 wt. part | PVA/Polyester emulsion (TOYOBO, Vylonal MD-1200) = 1/9 2 wt. parts | Water 100 wt. parts | None | 150° C. 5 min | 0.1 | 1.5 |
| 42 | (I) 1 wt. part | MMA/HEMA copolymer (1/9) emulsion 3 wt. parts | Water/IPA = 8/2 100 wt. | PEG-NP 1 wt. part | 200° C. 5 min | 0.5 | 1.0 |

TABLE 10-continued

| Ex. No. | Polymer (a') | Cross-linkable compound (b' or c') | Solvent (d) | Additive | Cross linking conditions | Film thickness ($\mu$m) | Corrosion length (mm) |
|---|---|---|---|---|---|---|---|
| 43 | (I) 0.3 wt. part | MMA/HEA copolymer (9/1) emulsion 0.7 wt. parts | Water 100 wt. parts | None | 180° C. 5 min | 0.1 | 1.5 |
| 44 | (I) 1 wt. part | Polyvinyl acetate emulsion (Koatsu Gas Kagaku, Pegal 365) 4 wt. parts | Water 100 wt. parts | PEG-OP 0.2 wt. part | 150° C. 3 min | 1 | 2.0 |
| 45 | (I) 0.5 wt. part | MMA/BA/MAA = 50/48/2 copolymer emulsion 4 wt. parts | Water 100 wt. parts | PEG-NP 0.2 wt. part Adekaria Soap SE-10N 0.2 wt. part | 80° C. 5 min | 0.1 | 1.5 |
| 46 | (I) 0.5 wt. part | MMA/BA/MAA/ NMMA = 45/48/ 2/5 copolymer emulsion 4 wt. parts | Water 100 wt. parts | PEG-NP 0.2 wt. part Adekaria Soap SE-10N 0.2 wt. part | 80° C. 5 | 0.1 | 1.0 |
| 47 | (I) 3 wt. parts | MMA/EA/MAA/ DAA = 25/70/2/3 copolymer emulsion 4 wt. parts | Water 100 wt. parts | PEG-NP 0.2 wt. part Adekaria Soap SE-10N 0.2 wt. part ADH 0.2 wt. part | 100° C. 3 min | 2 | 1.0 |

TABLE 11

| Ex. No. | Polymer (a') | Cross-linkable compound (b' or c') | Solvent (d) | Additive | Cross linking conditions | Film thickness ($\mu$m) | Corrosion length (mm) |
|---|---|---|---|---|---|---|---|
| 48 | (I) 3 wt. parts | Water-soluble polyester resin (Arakawa Kagaku, Araster-300) 5 wt. parts | Water 100 wt. parts | PEG-NP 0.5 wt. part | 150° C. 5 min | 2 | 1.0 |
| 49 | (I) 3 wt. parts | Water-soluble polyester (TOYOBO, Vylonal MD-1200) 5 wt. parts | Water/IPA = 9/1 100 wt. parts | None | 180° C. 1 min | 2 | 2.0 |
| 50 | (I) 5 wt. parts | Water-based acrylic emulsion (NIPPON CARBIDE, Nikazole PX301c) 5 wt. parts | Water/IPA 100 wt. parts | Sodium monooctyl- sulfonate 0.2 wt. parts | 150° C. 3 min | 2 | 2.0 |
| 51 | (I) 0.05 wt. part | EB-curable acrylic emulsion (TOYO INK, Microcril MG) 0.1 wt. part | Water/IPA = 8/2 100 wt. parts | None | Electron beam 5 min | 0.1 | 1.5 |
| 52 | (I) 3 wt. parts | Water-based vinylidene emulsion (TOAGOSEI DX-301) 1 wt. part | Water/IPA = 9/1 100 wt. parts | Barium stearate 1 wt. part | 180° C. 1 min | 1 | 1.0 |
| 53 | (I) 5 wt. parts | UV-curable emulsion (Shin Nakamura Kagaku, NK oligo UAW 63) 1 wt. part | Water/IPA = 8/2 100 wt. parts | None | UV- curing 120° C. 3 min | 2 | 1.5 |

TABLE 12

| Ex. No. | Polymer (a') | Cross-linkable compound (b' or c') | Solvent (d) | Additive | Cross linking conditions | Film thickness ($\mu$m) | Corrosion thickness (mm) |
|---|---|---|---|---|---|---|---|
| 54 | (II) 5 wt. parts | Acrylic resin (Mitsubishi Reyon, Dianal SE) 5 wt. parts | Xylene 100 wt. parts | None | 120° C. 5 min | 2 | 1.5 |
| 55 | (II) 3 wt. parts | EB-curable resin (Mitsubishi Reyon, Diabeam) 1 wt. part | Xylene 100 wt. parts | None | Electron beam 3 min | 0.5 | 1.0 |
| 56 | (I) 0.1 wt. part | Acrylic resin (Mitsubishi Rayon Dianal SE) 0.5 wt. part | Xylene 100 wt. parts | Oleic acid 0.5 wt. part | 130° C. 3 min | 0.1 | 1.5 |
| 57 | (I) 3 wt. parts | EB-curable resin (Mitsubishi Rayon, Diabeam) 3 wt. parts | Toluene 100 wt. parts | None | UV-curing 120° C. 3 min | 2 | 2.0 |
| 58 | (I) 3 wt. parts | Polyester type resin (Mitsubishi Rayon Diaclone ER) 5 wt. parts | Ethyl-benzene 100 wt. parts | None | 110° C. 5 min | 2 | 1.5 |

TABLE 13

| Ex. No. | Polymer (a') | Cross-linkable compound (b' or c') | Solvent (d) | Additive | Cross linking conditions | Film thickness ($\mu$m) | Corrosion length (mm) |
|---|---|---|---|---|---|---|---|
| 59 | (I) 0.1 | Water-soluble polyester resin (Arakawa Kagaku, Araster-300)/PVA = 9/1 1 wt. part | Water 100 wt. parts | Sodium dioctyl-sulfo-succinate 1 wt. part | 150° C. 5 min | 0.1 | 1.0 |
| 60 | (I) 0.1 wt. part | Water-based acrylic emulsion (NIPPON CARBIDE, Nikazole RX-301C)/PVA = 9/1 5 wt. parts | Water/IPA = 9/1 100 wt. parts | PEG-OP 0.4 wt. part | 180° C. 1 min | 2 | 2.0 |
| 61 | (I) 0.1 wt. part | EB-carable acrylic emulsion (TOYO INK, Microcril MG)/PVA = 9/1 0.3 wt. part | Water 100 wt. parts | Polyoxy-ethylene mono-stearate 0.2 wt. part | Electron beam 5 min | 0.1 | 1.5 |
| 62 | (I) 0.5 wt. part | Water-based vinylidene emulsion (TOAGOSEI, DX-301)/PVA = 9/1 0.5 wt. part | Water 100 wt. parts | Dodecyl-benzene-sulfonic acid 0.2 wt. part | 150° C. 3 min | 0.5 | 1.5 |
| 63 | (I) 10 wt. parts | UV-curable emulsion (Shin Nakamura, NK oligo UAW 63)/PVA = 9/1 5 wt. parts | Water 100 wt. parts | None | UV-curing 120° C. 3 min | 2 | 1.5 |

TABLE 14

| Comp. Ex. No. | Polymer, etc. | Binder polymer | Solvent | Additive | Heating conditions | Film thickness ($\mu$m) | Corrosion length (mm) |
|---|---|---|---|---|---|---|---|
| 3 | Polyaniline 1 wt. part | Water-based acrylic emulsion (NIPPON CARBIDE, Nikozole Rx301c) | NMP 100 wt. parts | None | 200° C. 2 min | 2 | 2.5 |

TABLE 14-continued

| Comp. Ex. No. | Polymer, etc. | Binder polymer | Solvent | Additive | Heating conditions | Film thickness ($\mu$m) | Corrosion length (mm) |
|---|---|---|---|---|---|---|---|
| 4 | Polyaniline 0.2 wt. part | 10 wt. parts Water-based acrylic emulsion (NIPPON CARBIDE, Nikazole RX301c) 2 wt. parts | NMP 100 wt. parts | None | 200° C. 2 min | 0.1 | 5.0 |
| 5 | Chromium compound 1 wt. part | Water-based acrylic emulsion (NIPPON CARBIDE, Nikazole RX301c) 10 wt. parts | NMP 100 wt. parts | None | 200° C. 2 min | 2 | 3.0 |
| 6 | None | None | None | None | — | — | 6.0 |

INDUSTRIAL APPLICABILITY

The composition comprising the cross-linkable, electrically conductive composition of this invention as the main component is applicable to various antistatic agents, condensers, batteries, EMI shields, chemical sensors, display devices, nonlinear materials, corrosion-preventing agents, adhesives, fibers, antistatic paints, corrosion-preventing paints, electrodeposition paints, plating primers, electrostatic coating primers, electric prevention of corrosion and enhancement of condenser capacity of batteries. In particular, the cross-linkable, electrically conductive composition of this invention has no dependency of electric conductivity on humidity and has a high transparency, and hence, is excellent in applicability to antistatic agents.

Specific applications of antistatic agents include wrapping materials, magnetic cards, magnetic tapes, magnetic discs, photographic films, printing materials, release films, heat-seal tapes or films, IC trays, IC carrier tapes, cover tapes and the like.

We claim:
1. A composition which comprises:
   (a) a soluble, electrically conducting polymer having a sulfonic acid group and/or a carboxyl group and showing a conductivity by self-doping with the sulfonic acid group and/or the carboxylic group
   (c) a compound having at least two functional groups capable of reacting with the sulfonic acid group and/or carboxyl group of the polymer (a), hence referred to as cross-linkable compound (c), said cross-linkable compound (c) being a low molecular weight compound selected from the group consisting of a cycloaliphatic diol or polyol, a sugar, an epoxy compound, a melamine and a urea.

2. A composition according to claim 1 which comprises (a) a, electrically conducting polymer having a sulfonic acid group and/or a carboxyl group, (b) a thermally cross-linkable or ultraviolet- or electron beam-cross-linkable resin and (c) a compound having at least two functional groups capable of reacting with the sulfonic acid group and/or carboxyl group of the soluble, electrically conducting polymer (a).

3. A cross-linkable, electrically conductive composition according to claim 1 comprising (a) a, electrically conducting polymer having a sulfonic acid group and/or a carboxyl group and (b) a thermally cross-linkable or ultraviolet- or electron beam-cross-linkable resin or paint which include a cross-linkable compound, wherein the said soluble, electrically conducting polymer (a) is a water-soluble, electrically conducting polymer having a molecular weight of at least 2,000 and comprising as a recurring unit at least one member selected from the group consisting of:

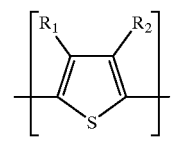

(1)

wherein each of $R_1$–$R_2$ is individually selected from the group consisting of H, —$SO_3^-$, —$SO_3H$, —$R_{19}SO_3^-$, —$R_{19}SO_3H$, —$OCH_3$, —$CH_3$, —$C_2H_5$, —F, —Cl, —Br, —I, —$N(R_{19})_2$, —$NHCOR_{19}$, —OH, —$O^-$, —$SR_{19}$, —$OR_{19}$, —$OCOR_{19}$, —$NO_2$, —COON, —$R_{19}COOH$, —$COOR_{19}$, —$COR_{19}$, —CHO and —CN in which $R_{19}$ is a $C_1$–$C_{24}$ alkyl, aryl or aralkyl group; at least one of $R_1$ and $R_2$ is a group selected from the group consisting of —$SO_3^-$, —$SO_3H$, —$R_{19}SO_3^-$, $R_{19}SO_3H$, —COOH and —$R_{19}COOH$ in which $R_{19}$ is as defined above; and the proportion of rings having said group is about 20% to 100%,

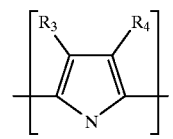

(2)

wherein each of $R_3$–$R_4$ is individually selected from the group consisting of H, —$SO_3^-$, —$SO_3H$, —$R_{19}SO_3^-$, —$R_{19}SO_3H$, —$OCH_3$, —$CH_3$, —$C_2H_5$, —F, —Cl, —Br, —I, —$N(R_{19})_2$, —$NHCOR_{19}$, —OH, —$O^-$, —$SR_{19}$, —$OR_{19}$, —$OCOR_{19}$, —$NO_2$, —COON, —$R_{19}COOH$, —$COOR_{19}$, —$COR_{19}$, —CHO and —CN in which $R_{19}$ is a $C_1$–$C_{24}$ alkyl, aryl or aralkyl group; at least one of $R_3$ and $R_4$ is a group selected from the group consisting of —$SO_3^-$, —$SO_3H$, —$R_{19}SO_3^-$, $R_{19}SO_3H$, —COOH and —$R_{19}COOH$ in which $R_{19}$ is as defined above; and the proportion of rings having said group is about 20% to 100%,

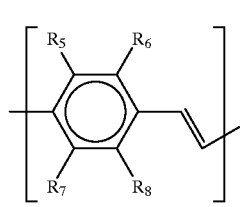
(3)

wherein each of $R_5$–$R_8$ is individually selected from the group consisting of H, —$SO_3^-$, —$SO_3H$, —$R_{19}SO_3^-$, —$R_{19}SO_3H$, —$OCH_3$, —$CH_3$, —$C_2H_5$, —F, —Cl, —Br, —I, —$N(R_{19})_2$, —$NHCOR_{19}$, —OH, —$O^-$, —$SR_{19}$, —$OR_{19}$, —$OCOR_{19}$, —$NO_2$, —COON, —$R_{19}COOH$, —$COOR_{19}$, —$COR_{19}$, —CHO and —CN in which $R_{19}$ is a $C_1$–$C_{24}$ alkyl, aryl or aralkyl group; at least one of $R_5$–$R_8$ is a group selected from the group consisting of —$SO_3^-$, —$SO_3H$, —$R_{19}SO_3^-$, $R_{19}SO_3H$, —COOH and —$R_{19}COOH$ in which $R_{19}$ is as defined above; and the proportion of rings having said group is about 20% to 100%,

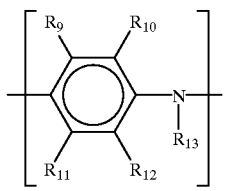
(4)

wherein each of $R_9$–$R_{13}$ is individually selected from the group consisting of H, —$SO_3^-$, —$SO_3H$, —$R_{19}SO_3^-$, —$R_{19}SO_3H$, —$OCH_3$, —$CH_3$, —$C_2H_5$, —F, —Cl, —Br, —I, —$N(R_{19})_2$, —$NHCOR_{19}$, —OH, —$O^-$, —$SR_{19}$, —$OR_{19}$, —$OCOR_{19}$, —$NO_2$, —COON, —$R_{19}COOH$, —$COOR_{19}$, —$COR_{19}$, —CHO and —CN in which $R_{19}$ is a $C_1$–$C_{24}$ alkyl, aryl or aralkyl group; at least one of $R_9$–$R_{13}$ is a group selected from the group consisting of —$SO_3^-$, —$SO_3H$, —$R_{19}SO_3^-$, $R_{19}SO_3H$, —COOH and —$R_{19}COOH$ in which $R_{19}$ is as defined above; and the proportion of rings having said group is about 20% to 100%,

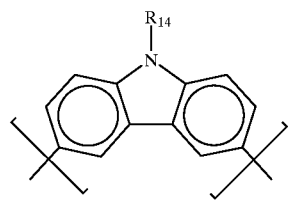
(5)

wherein $R_{14}$ is selected from the group consisting of —$SO_3^-$, —$SO_3H$, —$R_{19}SO_3^-$, —$R_{19}SO_3H$, —COOH and —$R_{19}COOH$ in which $R_{19}$ is a $C_1$–$C_{24}$ alkyl, aryl or aralkyl group.

4. A cross-linkable, electrically conductive composition according to claim 1 comprising (a) a, electrically conducting polymer having a sulfonic acid group and/or a carboxyl group and (b) a thermally cross-linkable or ultraviolet- or electron beam-cross-linkable resin or paint which include a cross-linkable compound, wherein the said soluble, electrically conducting polymer (a) comprises as a recurring unit

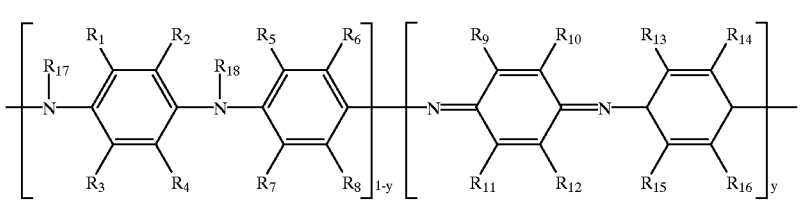
(6)

wherein $0 \leq y \leq 1$; each of $R_1$–$R_{18}$ is independently selected from the group consisting of H, —$SO_3^-$, —$SO_3H$, —$R_{19}SO_3^-$, —$R_{19}SO_3H$, —$OCH_3$, —$CH_3$, —$C_2H_5$, —F, —Cl, —Br, —I, —$N(R_{19})_2$, —$NHCOR_{19}$, —OH, —$O^-$, —$SR_{19}$, —$OR_{19}$, —$OCOR_{19}$, —$NO_2$, —COON, —$R_{19}COOH$, —$COOR_{19}$, —$COR_{19}$, —CHO and —CN in which $R_{19}$ is a $C_1$–$C_{24}$ alkyl, aryl or aralkyl group; at least one of $R_1$–$R_{16}$ is a group selected from the group consisting of —$SO_3^-$, —$SO_3H$, —$R_{19}SO_3^-$, $R_{19}SO_3H$, —COOH and —$R_{19}COOH$ in which $R_{19}$ is as defined above; and the proportion of rings having said group is about 20% to 100%.

5. A cross-linkable, electrically conductive composition according to claim 1 comprising (a) a, electrically conducting polymer having a sulfonic acid group and/or a carboxyl group and (b) a thermally cross-linkable or ultraviolet- or electron beam-cross-linkable resin or paint which include a cross-linkable compound, wherein the said soluble, electrically conducting polymer (a) is:

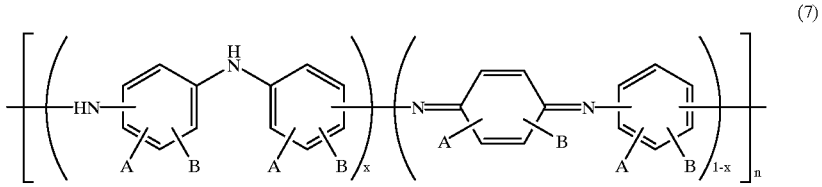

(7)

wherein A is one group selected from the group consisting of sulfonic acid group, carboxyl group, and their alkali metal salts, ammonium salts and substituted ammonium salts; B represents one group selected from the group consisting of methyl group, ethyl group, n-propyl group, isopropyl group, n-butyl group, isobutyl group, sec-butyl group, t-butyl group, dodecyl group, tetracosyl group, methoxy group, ethoxy group, n-propoxy group, isopropoxy group, n-butoxy group, isobutoxy group, sec-butoxy group, t-butoxy group, heptoxy group, hexoxy group, octoxy group, dodecoxy group, tetracosoxy group, fluoro group, chloro group and bromo group; x represents any number of 0 to 1; n represents a degree of polymerization of 3 or more.

6. A cross-linkable, electrically conductive composition according to claim 1 comprising (a) a, electrically conducting polymer having a sulfonic acid group and/or a carboxyl group and (b) a thermally cross-linkable or ultraviolet- or electron beam-cross-linkable resin or paint which include a cross-linkable compound, wherein the said soluble, electrically conducting polymer (a) has a sulfonic acid group content of 50% or more.

7. The composition according to claim 6, wherein the substituent of said soluble, electrically conducting polymer (a) is an electron donating group.

8. The composition according to claim 6, wherein the substituent of said soluble, electrically conducting polymer (a) is an electron donating group and the content of the sulfonic acid group is 80% or more.

9. The composition according to claim 6, wherein the substituent of said soluble, electrically conducting polymer (a) is an alkoxy group and the content of the sulfonic acid group is 80% or more.

10. A cross-linkable electric conductor in which the film of the composition according to claim 1 is formed on at least one surface of a substrate.

* * * * *